(12) United States Patent
Okada et al.

(10) Patent No.: US 11,930,256 B2
(45) Date of Patent: Mar. 12, 2024

(54) IMAGING DEVICE, IMAGING OPTICAL SYSTEM, AND IMAGING METHOD

(71) Applicant: FUJIFILM Corporation, Tokyo (JP)

(72) Inventors: Kazuyoshi Okada, Saitama (JP);
Yasunobu Kishine, Saitama (JP);
Atsushi Kawanago, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 159 days.

(21) Appl. No.: 17/721,330

(22) Filed: Apr. 14, 2022

(65) Prior Publication Data

US 2022/0239850 A1 Jul. 28, 2022

Related U.S. Application Data

(63) Continuation of application No. PCT/JP2020/040065, filed on Oct. 26, 2020.

(30) Foreign Application Priority Data

Oct. 30, 2019 (JP) .................................. 2019-197778

(51) Int. Cl.
*H04N 23/11* (2023.01)
*G02B 5/30* (2006.01)
*G02B 15/14* (2006.01)

(52) U.S. Cl.
CPC ........... *H04N 23/11* (2023.01); *G02B 5/3033* (2013.01); *G02B 15/142* (2019.08)

(58) Field of Classification Search
None
See application file for complete search history.

(56) References Cited

U.S. PATENT DOCUMENTS 9,118,796 B2    8/2015  Hiramoto et al.
9,509,893 B2 *  11/2016 Korenaga ............ G01N 21/359
(Continued)

FOREIGN PATENT DOCUMENTS

CN    103703770    4/2014
CN    107026992    8/2017
(Continued)

OTHER PUBLICATIONS

"International Search Report (Form PCT/ISA/210) of PCT/JP2020/040065," dated Jan. 12, 2021, with English translation thereof, pp. 1-5.

(Continued)

*Primary Examiner* — James M Hannett
(74) *Attorney, Agent, or Firm* — JCIPRNET

(57) ABSTRACT

Provided are an imaging device which can simultaneously capture images in different wavelength ranges and can improve a focusing accuracy of each image, an imaging optical system, and an imaging method. An imaging device (1) includes an imaging optical system (10) which has a first pupil region for passing light in a first wavelength range and a second pupil region for passing light in a second wavelength range, in which an axial chromatic aberration of the imaging optical system (10) is reduced based on a relationship between an aberration other than the axial chromatic aberration of the imaging optical system (10) and positions of the first pupil region and the second pupil region in the imaging optical system (10), an imaging element (100) which includes a first pixel receiving the light passing through the first pupil region in the imaging optical system (10) and a second pixel receiving the light passing through the second pupil region in the imaging optical system (10), and a signal processing unit (200) which processes a signal output from the imaging element (100), and generates each (Continued)

of a first image of the first wavelength range and a second image of the second wavelength range based on an output signal of the first pixel and an output signal of the second pixel.

23 Claims, 25 Drawing Sheets

(56) References Cited

U.S. PATENT DOCUMENTS

| | | | |
|---|---|---|---|
| 10,015,390 B2 | 7/2018 | Fukuda | |
| 10,477,099 B2 | 11/2019 | Fukuda | |
| 11,067,772 B2 | 7/2021 | Fukuda | |
| 11,422,335 B2 | 8/2022 | Fukuda | |
| 11,460,617 B2 | 10/2022 | Ono | |
| 2013/0038751 A1* | 2/2013 | Kurahashi | H04N 25/704 348/222.1 |
| 2013/0222676 A1 | 8/2013 | Ono | |
| 2014/0055661 A1* | 2/2014 | Imamura | A61B 1/00096 348/342 |
| 2014/0168490 A1* | 6/2014 | Imamura | H01L 27/14625 348/302 |
| 2015/0130962 A1 | 5/2015 | Hiramoto et al. | |
| 2015/0234150 A1* | 8/2015 | Katsunuma | G01J 3/2803 348/360 |
| 2022/0078319 A1* | 3/2022 | Okada | H04N 23/55 |

FOREIGN PATENT DOCUMENTS

| | | |
|---|---|---|
| JP | H10170816 | 6/1998 |
| JP | 2004157059 | 6/2004 |
| WO | 2012043211 | 4/2012 |
| WO | 2014020791 | 2/2014 |
| WO | 2019073881 | 4/2019 |

OTHER PUBLICATIONS

"International Preliminary Report on Patentability (Form PCT/IPEA/409) of PCT/JP2020/040065," completed on Jul. 30, 2021, with English translation thereof, pp. 1-6.

"Office Action of China Counterpart Application", dated Oct. 27, 2023, with English translation thereof, p. 1-p. 17.

* cited by examiner

[SPHERICAL ABERRATION: POSITIVE]

[SPHERICAL ABERRATION: NEGATIVE]

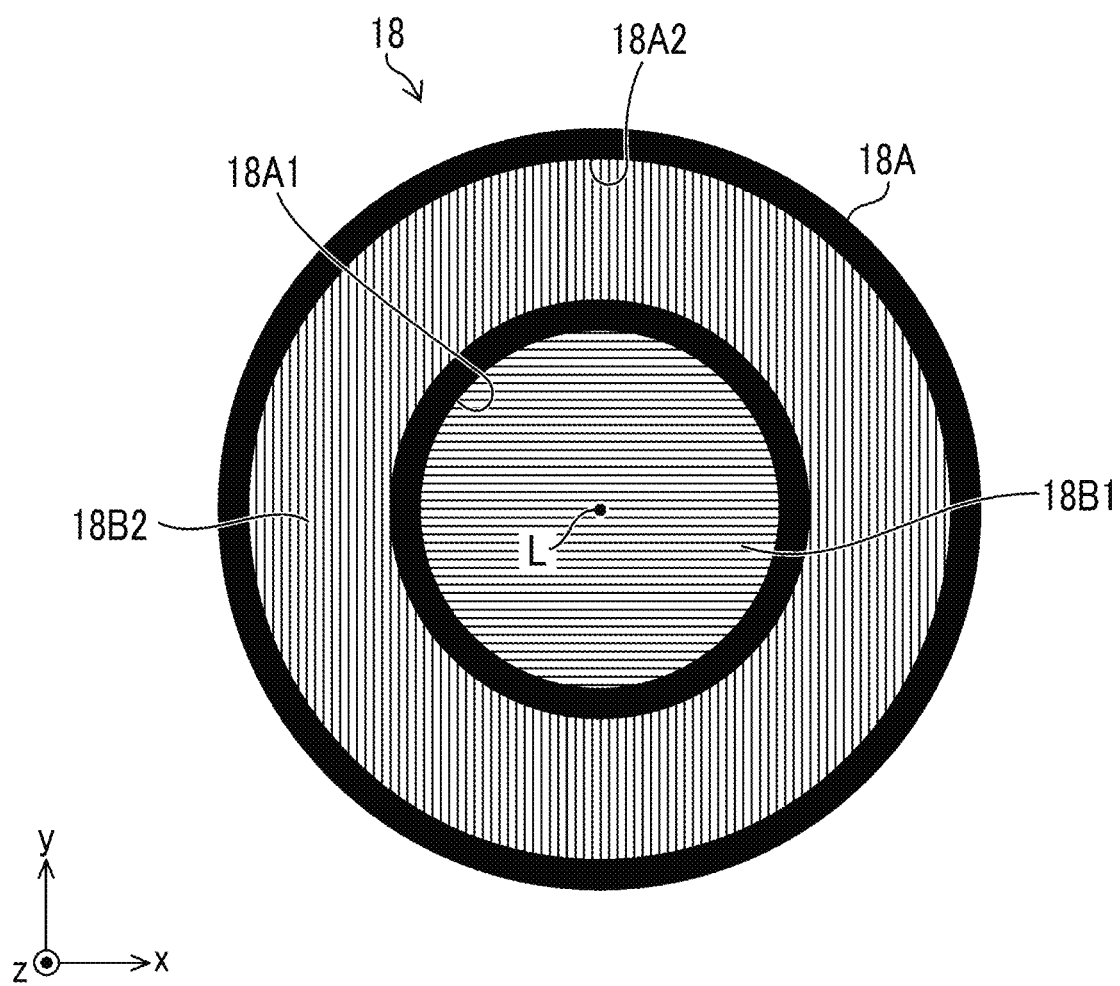

FIG. 15

| ABERRATION TYPE | SPHERICAL ABERRATION | COMA ABERRATION | ASTIGMATISM |
|---|---|---|---|
| (A) ABERRATION CHARACTERISTICS | a1, b1, c1 | c1, b1, a1 | c1, b1, a1 / a1, c1 |
| (B) WAVELENGTH ALLOCATION IMAGE | a2, b2, c2 | c2, b2, a2 | c2, b2, a2 / a2, c2 |
| (C) CONCENTRIC CIRCLE TYPE | ● | — | — |
| (D) CIRCULAR OPENING VERTICAL 3-HOLE TYPE | ● ● ● | ● ● ● | — |
| (E) CIRCULAR OPENING CROSS 5-HOLE TYPE | ● ● ● ● ● | ● ● ● ● ● | ● ● ● ● ● |

WAVELENGTH: LONG ●●●●● → SHORT    ● : VISIBLE WHITE

FIG. 16

| ABERRATION TYPE | SPHERICAL ABERRATION | COMA ABERRATION | ASTIGMATISM |
|---|---|---|---|
| (F) CIRCULAR OPENING VERTICAL 5-HOLE TYPE | ● (vertical 5 dots) | ● (vertical 5 dots) | — |
| (G) CIRCULAR OPENING CROSS 9-HOLE TYPE | cross 9 dots | cross 9 dots | cross 9 dots |
| (H) CIRCULAR OPENING 8-DIRECTION AND 9-HOLE TYPE | 8 around + center | 8 around + center | 8 around + center |
| (I) CIRCULAR OPENING ASTIGMATISM SPECIAL TYPE | — | — | ring of dots |
| (J) SQUARE OPENING 2×2 TYPE | — | diamond | 2×2 diamond |

WAVELENGTH: LONG  SHORT    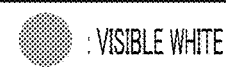 : VISIBLE WHITE

FIG. 17

| ABERRATION TYPE | SPHERICAL ABERRATION | COMA ABERRATION | ASTIGMATISM |
|---|---|---|---|
| (K) SQUARE OPENING 8-HOLE RHOMBUS TYPE | | ◆ | ◆ |
| (L) SQUARE OPENING 3×3 TYPE | | ■ | ■ |
| (M) SQUARE OPENING CROSS TYPE | | ✚ | ✚ |
| (N) FAN-SHAPED 4-SPLIT TYPE | | ● | ⊗ |
| (O) FAN-SHAPED 8-SPLIT TYPE | | ● | ● |

WAVELENGTH: LONG ●●●●● → SHORT          : VISIBLE WHITE

FIG. 19

| EXAMPLE 1·LENS DATA (n, $\nu$ : d LINE) | | | | |
|---|---|---|---|---|
| PLANE NUMBER | CURVATURE RADIUS | PLANE SPACING | n (REFRACTIVE INDEX) | $\nu$ (ABBE NUMBER) |
| 1 | 180.3645 | 0.9998 | 1.61192 | 55.42 |
| 2 | 16.8495 | 2.8496 | | |
| 3 | 56.9752 | 3.8676 | 1.85000 | 22.50 |
| 4 | −123.1749 | 0.1999 | | |
| 5 | 19.9894 | 7.0002 | 1.85001 | 40.14 |
| 6 | −24.0553 | 1.0098 | 1.62708 | 35.60 |
| 7 | 11.9173 | 7.7896 | | |
| 8 (STOP) | ∞ | 5.4882 | | |
| 9 | −24.3827 | 2.5306 | 1.82434 | 23.78 |
| 10 | 19.0348 | 5.9999 | 1.85000 | 43.00 |
| 11 | −21.3645 | 5.9182 | | |
| 12 | 33.2346 | 5.3766 | 1.64134 | 34.19 |
| 13 | 19.5757 | 5.5403 | | |
| 14 | 29.5726 | 5.9774 | 1.85000 | 43.00 |
| 15 | −61.8294 | 10.0000 | | |
| 16 | ∞ | 1.0000 | 1.51680 | 64.20 |

FIG. 22

| WAVELENGTH [nm] | AXIAL CHROMATIC ABERRATION (BASED ON 560 nm) [$\mu$m] ||
| --- | --- | --- |
| | NO FILTER | WITH FILTER |
| 475 | −16.10 | 7.64 |
| 560 | 0 | 0 |
| 668 | 57.99 | 12.57 |
| 717 | 84.35 | 9.43 |
| EVALUATION AT MTF PEAK POSITION OF 73 lp/mm |||

FIG. 23
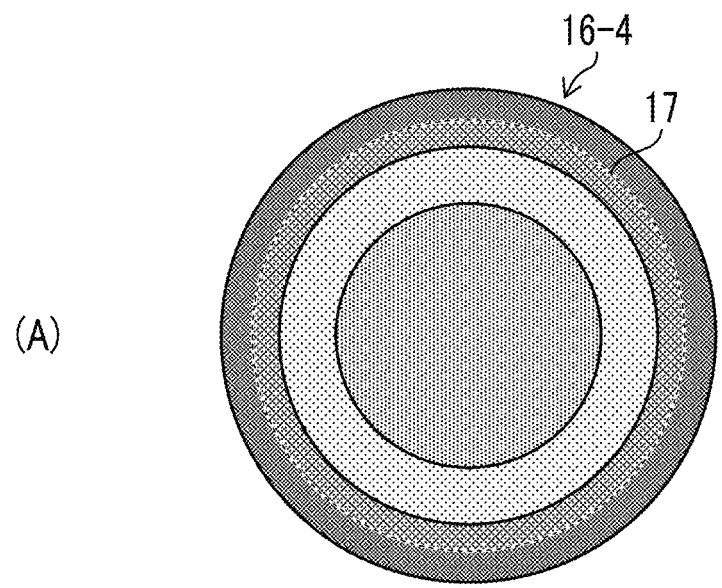
(A)
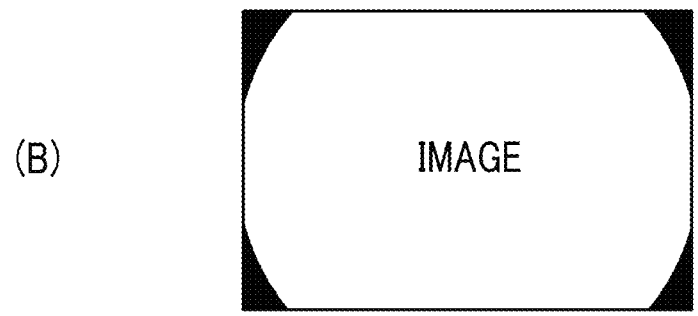
(B)
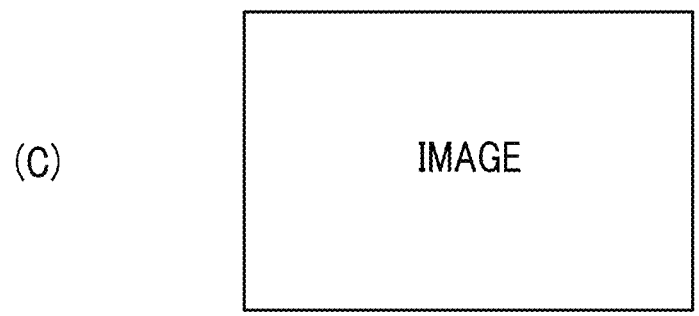
(C)

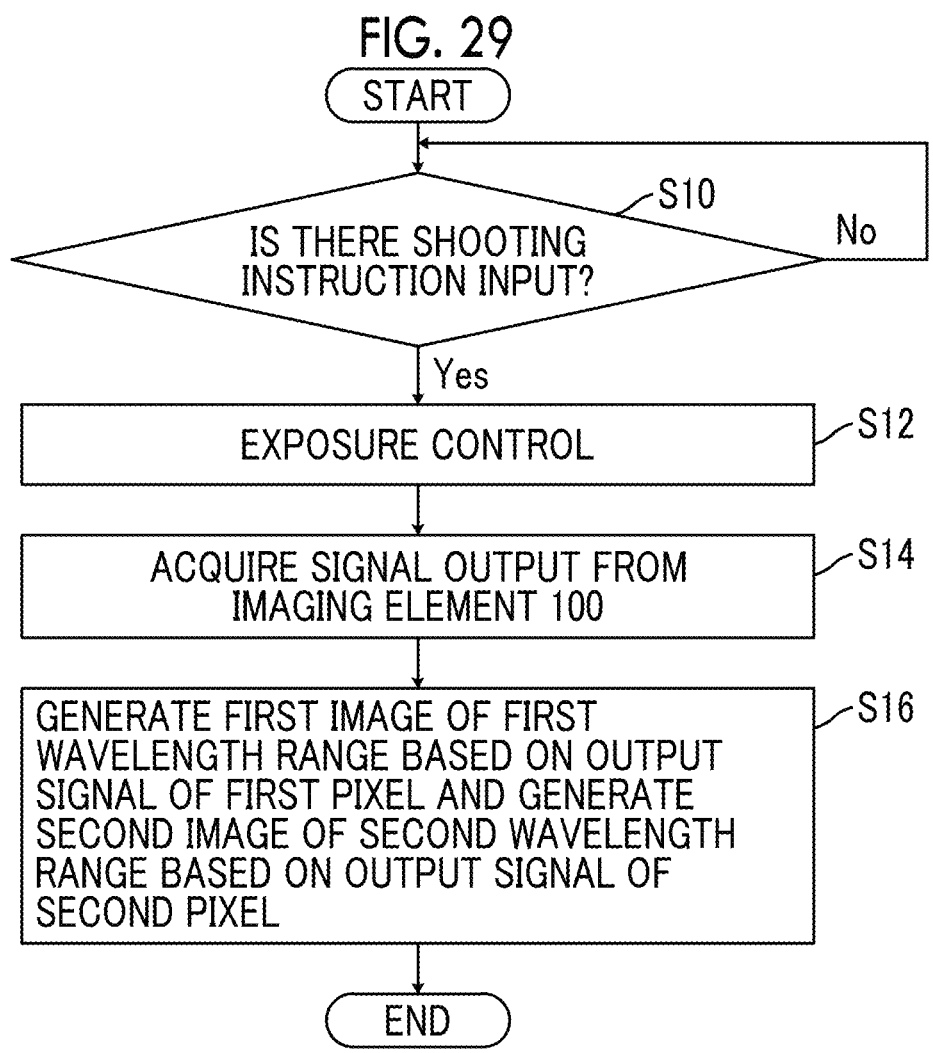

IMAGING DEVICE, IMAGING OPTICAL SYSTEM, AND IMAGING METHOD

CROSS-REFERENCE TO RELATED APPLICATIONS

The present application is a Continuation of PCT International Application No. PCT/JP2020/040065 filed on Oct. 26, 2020 claiming priority under 35 U.S.C § 119(a) to Japanese Patent Application No. 2019-197778 filed on Oct. 30, 2019. Each of the above applications is hereby expressly incorporated by reference, in its entirety, into the present application.

BACKGROUND OF THE INVENTION

1. Field of the Invention

The present invention relates to an imaging device, an imaging optical system, and an imaging method, and particularly relates to a technique for capturing an image of a plurality of wavelength ranges.

2. Description of the Related Art

In the related arts, a multi-band camera disclosed in JP2004-157059A has been proposed as this type of imaging device.

This multi-band camera includes an imaging optical system having an imaging lens system and a spectroscopic filter plate. The spectroscopic filter plate is inserted in an optical path passing through the imaging lens system, and a plurality of spectral regions which transmit light in a plurality of wavelength ranges different from each other have spectroscopic filters which are arranged substantially concentrically about an optical axis of the imaging lens system.

The multi-band camera captures a plurality of spectroscopic images of a subject in a surface-sequential manner by switching between a light-transmitting state and a light-blocking state in the plurality of spectroscopic regions of the spectroscopic filter plate.

In addition, imagery misregistration characteristics of chromatic aberration of the imaging lens system with respect to each of the plurality of wavelength ranges are adjusted so as to be substantially canceled by spherical aberration of the imaging lens system and the spectroscopic filter.

SUMMARY OF THE INVENTION

One embodiment according to a technique of the present disclosure provides an imaging device which can simultaneously capture images in different wavelength ranges and can improve a focusing accuracy of each image, an imaging optical system, and an imaging method.

An imaging device according to one aspect of the present invention includes an imaging optical system which has a first pupil region for passing light in a first wavelength range and a second pupil region for passing light in a second wavelength range different from the first wavelength range, in which an axial chromatic aberration of the imaging optical system due to a difference between the first wavelength range and the second wavelength range is reduced based on a relationship between an aberration other than the axial chromatic aberration of the imaging optical system and positions of the first pupil region and the second pupil region in the imaging optical system, an imaging element which includes a first pixel receiving the light passing through the first pupil region in the imaging optical system and a second pixel receiving the light passing through the second pupil region in the imaging optical system, and a signal processing unit which processes a signal output from the imaging element, and generates each of a first image of the first wavelength range and a second image of the second wavelength range based on an output signal of the first pixel and an output signal of the second pixel.

In the imaging device according to another aspect of the present invention, the aberration other than the axial chromatic aberration of the imaging optical system is a spherical aberration.

In the imaging device according to another aspect of the present invention, it is preferable that, in a case where the spherical aberration is negative, the first pupil region is a pupil region closer to an optical axis of the imaging optical system than the second pupil region, and a representative wavelength of the first wavelength range is shorter than a representative wavelength of the second wavelength range.

In the imaging device according to another aspect of the present invention, it is preferable that the first pupil region is a circular or annular pupil region divided by a concentric circle centered on the optical axis of the imaging optical system, and the second pupil region is an annular pupil region outside the first pupil region.

In the imaging device according to still another aspect of the present invention, the aberration other than the axial chromatic aberration of the imaging optical system is a coma aberration.

In the imaging device according to still another aspect of the present invention, it is preferable that an image-forming position of the light passing through the first pupil region on an optical axis of the imaging optical system is moved to an image side with respect to an image-forming position of the light passing through the second pupil region on the optical axis due to the coma aberration of the imaging optical system, and a representative wavelength of the first wavelength range is shorter than a representative wavelength of the second wavelength range.

In the imaging device according to still another aspect of the present invention, it is preferable that the imaging optical system has the coma aberration by which, among a first region and a second region which are located, with the optical axis in between, opposite to each other through a straight line intersecting the optical axis of the imaging optical system, an image-forming position of light incident on the first region on the optical axis is moved to the image side and an image-forming position of light incident on the second region on the optical axis is moved to an object side, and the first pupil region is a pupil region corresponding to the first region in the imaging optical system, and the second pupil region is a pupil region corresponding to the second region in the imaging optical system.

In the imaging device according to still another aspect of the present invention, the aberration other than the axial chromatic aberration of the imaging optical system is an astigmatism.

In the imaging device according to still another aspect of the present invention, it is preferable that an image-forming position of the light passing through the first pupil region on an optical axis of the imaging optical system is moved to an image side with respect to an image-forming position of the light passing through the second pupil region on the optical axis due to the astigmatism of the imaging optical system, and a representative wavelength of the first wavelength range is shorter than a representative wavelength of the second wavelength range.

In the imaging device according to still another aspect of the present invention, it is preferable that the imaging optical system has the astigmatism by which an image-forming position of light incident on a first region symmetrical to the optical axis of the imaging optical system on the optical axis is moved to the image side, and an image-forming position of light incident on a second region which is symmetrical to the optical axis and orthogonal to the first region on the optical axis is moved to an object side, and the first pupil region is a pupil region corresponding to the first region in the imaging optical system, and the second pupil region is a pupil region corresponding to the second region in the imaging optical system.

In the imaging device according to still another aspect of the present invention, it is preferable that the imaging optical system includes a wavelength selective filter unit having a first wavelength selective filter which allows the light in the first wavelength range to pass through the first pupil region, and a second wavelength selective filter which allows the light in the second wavelength range to pass through the second pupil region.

In the imaging device according to still another aspect of the present invention, it is preferable that the imaging optical system further has a third pupil region for passing light in a third wavelength range intermediate between the first wavelength range and the second wavelength range, the third pupil region is a pupil region between the first pupil region and the second pupil region, the imaging element further includes a third pixel receiving the light passing through the third pupil region, and the signal processing unit further generates a third image of the third wavelength range based on an output signal of the third pixel.

In the imaging device according to still another aspect of the present invention, it is preferable that the imaging optical system includes a first polarization filter polarizing the light passing through the first pupil region in a first direction, and a second polarization filter polarizing the light passing through the second pupil region in a second direction different from the first direction, and a third polarization filter polarizing incident light in the first direction is provided in the first pixel of the imaging element, and a fourth polarization filter polarizing incident light in the second direction is provided in the second pixel of the imaging element.

In the imaging device according to still another aspect of the present invention, it is preferable that a third wavelength selective filter for passing the light in the first wavelength range of incident light is provided in the first pixel of the imaging element, and a fourth wavelength selective filter for passing the light in the second wavelength range of incident light is provided in the second pixel of the imaging element.

In the imaging device according to still another aspect of the present invention, it is preferable that a first light blocking mask having a first microlens and a first opening corresponding to the first pupil region is provided in the first pixel of the imaging element, and a second light blocking mask having a second microlens and a second opening corresponding to the second pupil region is provided in the second pixel of the imaging element.

In the imaging device according to still another aspect of the present invention, it is preferable that the imaging optical system limits luminous flux incident on the imaging element only in a stop or only in the first pupil region and the second pupil region, which function as the stop.

In the imaging device according to still another aspect of the present invention, it is preferable that the imaging optical system has a front lens group disposed on an object side with respect to a stop, and a rear lens group disposed on an image side with respect to the stop, the first pupil region and the second pupil region are located between the front lens group and the rear lens group, and the front lens group has an angular magnification which makes an angle of off-axis principal ray incident on the first pupil region and the second pupil region close to perpendicular to a stop plane.

In the imaging device according to still another aspect of the present invention, it is preferable that the imaging optical system has a front lens group disposed on an object side with respect to a stop, and a rear lens group disposed on an image side with respect to the stop, the first pupil region and the second pupil region are located between the front lens group and the rear lens group, and the front lens group has a focal length which makes an angle of on-axis marginal ray incident on the first pupil region and the second pupil region close to perpendicular to a stop plane.

In the imaging device according to still another aspect of the present invention, it is preferable that the first pupil region and the second pupil region function as a stop, or are adjacent to a stop.

In the imaging device according to still another aspect of the present invention, it is preferable that in a case where n represents an integer of 2 or more, i represents a parameter which changes in a range of 1 to n, Qi represents an i-th pupil region in the imaging optical system, $\lambda_{ij}$ represents a representative wavelength of light transmitted the i-th pupil region $\Omega i$, $m_i$ represents the number of representative wavelengths in the i-th pupil region $\Omega i$, j represents a parameter which changes in a range of 1 to m, $\lambda_{ij}$ represents a j-th representative wavelength in the i-th pupil region $\Omega i$, $f(\lambda)$ represents a paraxial focal length of the imaging optical system at a wavelength $\lambda$, $g(x,y;\lambda)$ represents an on-axis longitudinal aberration of the wavelength $\lambda$ in a pupil coordinate $(x,y)$ of the pupil region in the imaging optical system, and $S\Omega_i$ represents an area of the i-th pupil region $\Omega i$;

$$|f(\lambda_{i_1 j_1}) - f(\lambda_{i_2 j_2})| > a \quad \text{[expression 1]}$$

$$\left| \left\{ \frac{\iint_{\Omega_{i_1}} g(x_{i_1}, y_{i_1}; \lambda_{i_1 j_1}) dx_{i_1} dy_{i_1}}{S_{\Omega_{i_1}}} - \frac{\iint_{\Omega_{i_2}} g(x_{i_2}, y_{i_2}; \lambda_{i_2 j_2}) dx_{i_2} dy_{i_2}}{S_{\Omega_{i_2}}} \right\} - \{f(\lambda_{i_1 j_i}) - f(\lambda_{i_2 j_2})\} \right| < b \quad \text{[expression 2]}$$

the imaging optical system has a combination of i1, i2, j1, and j2 satisfying [expression 1] and [expression 2] (where, a≥b).

In the imaging device according to still another aspect of the present invention, it is preferable that, in a case where a pixel pitch of the imaging element is defined as p, b in [expression 2] satisfies b≤8p.

The invention according to still another aspect is an imaging optical system constituting the above-described imaging device.

The invention according to still another aspect in an imaging optical system comprising: a first pupil region for passing light in a first wavelength range; and a second pupil region for passing light in a second wavelength range different from the first wavelength range, in which an axial chromatic aberration of the imaging optical system due to a difference between the first wavelength range and the second wavelength range is reduced based on a relationship between an aberration other than the axial chromatic aberration of the imaging optical system and positions of the first pupil region and the second pupil region in the imaging optical system, and in a case where n represents an integer of 2 or more, i represents a parameter which changes in a range of 1 to n, Ωi represents an i-th pupil region in the imaging optical system, $\lambda_{ij}$ represents a representative wavelength of light transmitted the i-th pupil region Ωi, $m_i$ represents the number of representative wavelengths in the i-th pupil region Ωi, j represents a parameter which changes in a range of 1 to m, $\lambda_{ij}$ represents a j-th representative wavelength in the i-th pupil region Ωi, f(λ) represents a paraxial focal length of the imaging optical system at a wavelength λ, g(x,y;λ) represents an on-axis longitudinal aberration of the wavelength λ in a pupil coordinate (x,y) of the pupil region in the imaging optical system, and $S\Omega_i$ represents an area of the i-th pupil region Ωi, $$|f(\lambda_{i_1 j_1}) - f(\lambda_{i_2 j_2})| > a \quad \text{[expression 1]}$$

$$\left| \left\{ \frac{\iint_{\Omega_{i_1}} g(x_{i_1}, y_{i_1}; \lambda_{i_1 j_1}) dx_{i_1} dy_{i_1}}{S_{\Omega_{i_1}}} - \frac{\iint_{\Omega_{i_2}} g(x_{i_2}, y_{i_2}; \lambda_{i_2 j_2}) dx_{i_2} dy_{i_2}}{S_{\Omega_{i_2}}} \right\} - \{f(\lambda_{i_1 j_i}) - f(\lambda_{i_2 j_2})\} \right| < b \quad \text{[expression 2]}$$

the imaging optical system has a combination of i1, i2, j1, and j2 satisfying [expression 1] and [expression 2] (where, a≥b).

An imaging method according to still another aspect of the present invention includes a step of preparing an imaging optical system which has a first pupil region for passing light in a first wavelength range and a second pupil region for passing light in a second wavelength range different from the first wavelength range, in which an axial chromatic aberration of the imaging optical system due to a difference between the first wavelength range and the second wavelength range is reduced based on a relationship between an aberration other than the axial chromatic aberration of the imaging optical system and positions of the first pupil region and the second pupil region in the imaging optical system, a step of dividing each of the light passing through the first pupil region in the imaging optical system and the light passing through the second pupil region in the imaging optical system into pupils to be incident on a first pixel and a second pixel included in an imaging element, and a step of processing, by a signal processing unit, a signal output from the imaging element, and generating each of a first image of the first wavelength range and a second image of the second wavelength range based on an output signal of the first pixel and an output signal of the second pixel.

BRIEF DESCRIPTION OF THE DRAWINGS

FIG. 5 is a front view of a polarization filter unit shown in FIG. 1.

FIG. 15 is a diagram showing an aberration type of the imaging optical system and a variation of a bandpass filter unit corresponding to the aberration type.

FIG. 16 is a diagram showing the aberration type of the imaging optical system and another variation of a bandpass filter unit corresponding to the aberration type.

FIG. 17 is a diagram showing the aberration type of the imaging optical system and still another variation of a bandpass filter unit corresponding to the aberration type.

FIG. 19 is a chart showing lens data of the imaging optical system shown in FIG. 18.

FIG. 22 is a chart showing changes in axial chromatic aberration of the imaging optical system in a case where a bandpass filter unit is not provided in the imaging optical system shown in FIG. 18 and in a case where a bandpass filter unit is provided in the imaging optical system shown in FIG. 18.

FIG. 23 is a diagram used to explain an off-axis luminous flux diameter on a stop.

FIG. 29 is a flowchart showing an embodiment of an imaging method according to the present invention.

DESCRIPTION OF THE PREFERRED EMBODIMENTS

Hereinafter, preferred embodiments of an imaging device, an imaging optical system, and an imaging method according to an embodiment of the present invention will be described with reference to the accompanying drawings.

[Configuration of Imaging Device]

Figure 1:
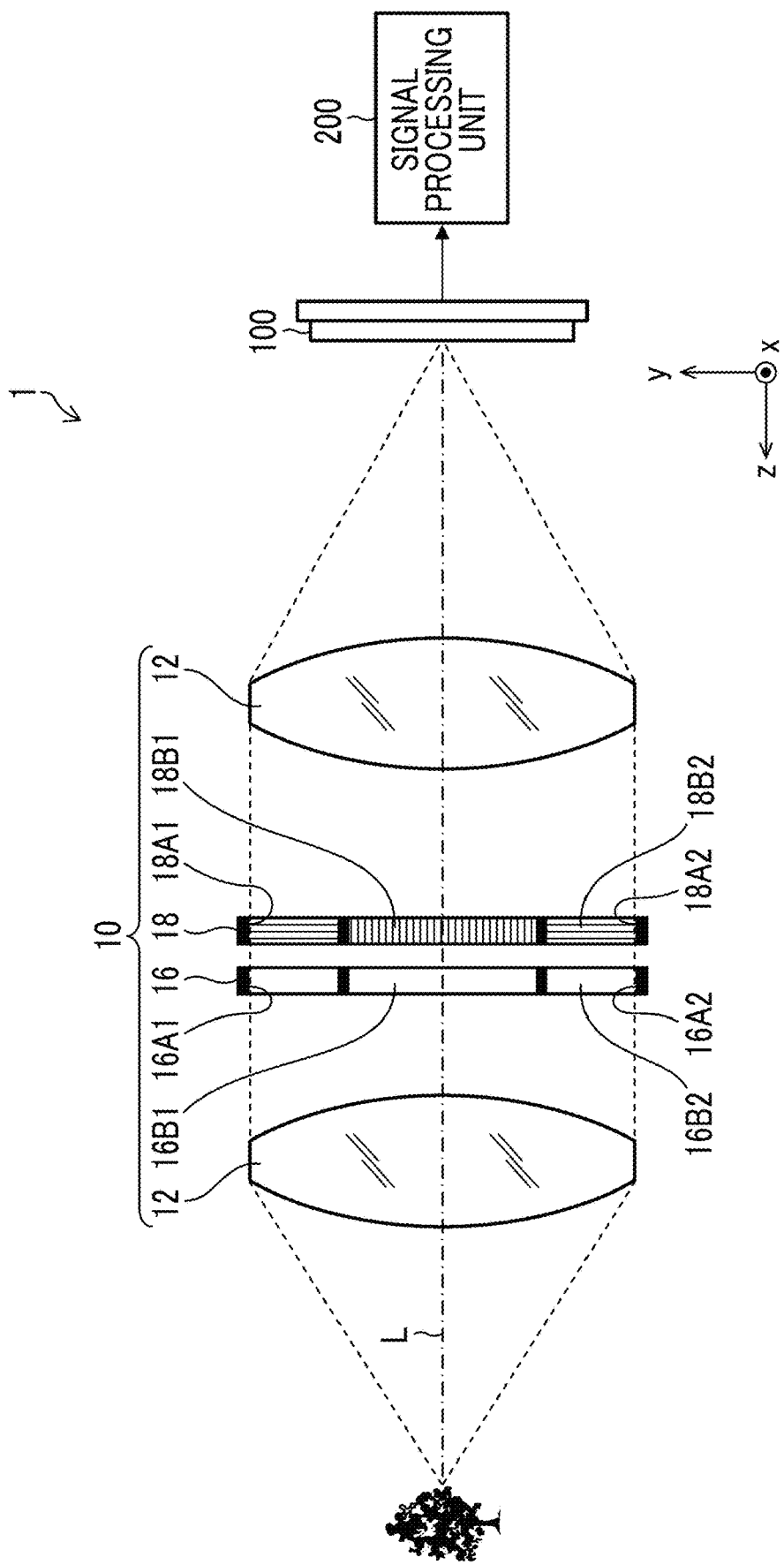
FIG. 1 is a diagram illustrating a schematic configuration of an embodiment of an imaging device according to the present invention.

FIG. 1 is a diagram illustrating a schematic configuration of an embodiment of an imaging device according to the present invention.

An imaging device 1 according to the present embodiment is a multispectral camera which captures a first image and a second image having different wavelength ranges, and includes an imaging optical system 10, an imaging element 100, and a signal processing unit 200.

[Imaging Optical System]

The imaging optical system 10 is configured by combining a plurality of lenses 12. The imaging optical system 10 has a bandpass filter unit 16 and a polarization filter unit 18 in the vicinity of a pupil thereof. In addition, the imaging optical system 10 has a focus adjustment mechanism (not shown). For example, the focus adjustment mechanism adjusts a focus by moving the entire imaging optical system 10 back and forth along an optical axis L.

Figure 2:
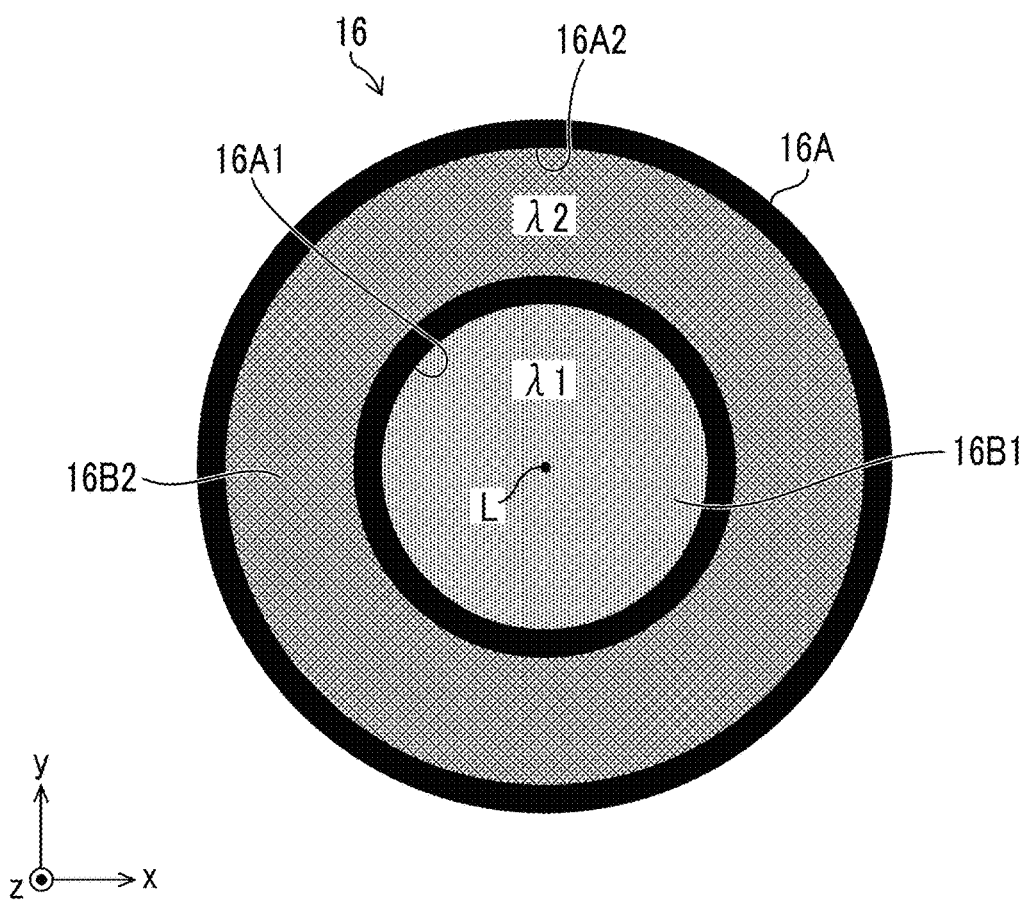
FIG. 2 is a front view showing an embodiment of a bandpass filter unit shown in FIG. 1.

FIG. 2 is a front view showing an embodiment of a bandpass filter unit shown in FIG. 1.

The bandpass filter unit 16 shown in FIG. 2 is an example of a first pupil region for passing light in a first wavelength range $\lambda 1$ and a second pupil region for passing light in a second wavelength range $\lambda 2$ different from the first wavelength range, and functions as a wavelength selective unit which transmits light in a wavelength range different for each of the pupil regions of the first pupil region and the second pupil region.

The bandpass filter unit 16 is provided such that the center coincides with the optical axis L of the imaging optical system 10, and is composed of a frame 16A including a circular opening region 16A1 divided by a concentric circle centered on the optical axis L and an annular opening region 16A2 outside the opening region 16A1, and two wavelength selective filters (bandpass filters) 16B1 and 16B2 provided in the frame 16A.

In the following, as necessary, one opening region 16A1 provided in the frame 16A is referred to as a first opening region 16A1 and the other opening region 16A2 is referred to as a second opening region 16A2 to distinguish between the two opening regions 16A1 and 16A2. In addition, a bandpass filter 16B1 provided in the first opening region 16A1 is referred to as a first bandpass filter 16B1 and a bandpass filter 16B2 provided in the second opening region 16A2 is referred to as a second bandpass filter 16B2 to distinguish between the two bandpass filters 16B1 and 16B2.

The frame 16A has light shielding properties, and transmits the light in the first wavelength range $\lambda 1$ and the light in the second wavelength range $\lambda 2$ through the first bandpass filter 16B1 and the second bandpass filter 16B2 provided in the two opening regions 16A1 and 16A2. The bandpass filter unit 16 functions as a stop. A stop (not shown) may be provided in the imaging optical system 10, and the bandpass filter unit 16 may be installed adjacent to the stop.

In addition, as is clear from FIG. 2, a region (first pupil region) of the first bandpass filter 16B1 is a pupil region closer to the optical axis L of the imaging optical system 10 than a region (second pupil region) of the second bandpass filter 16B2.

Figure 3:
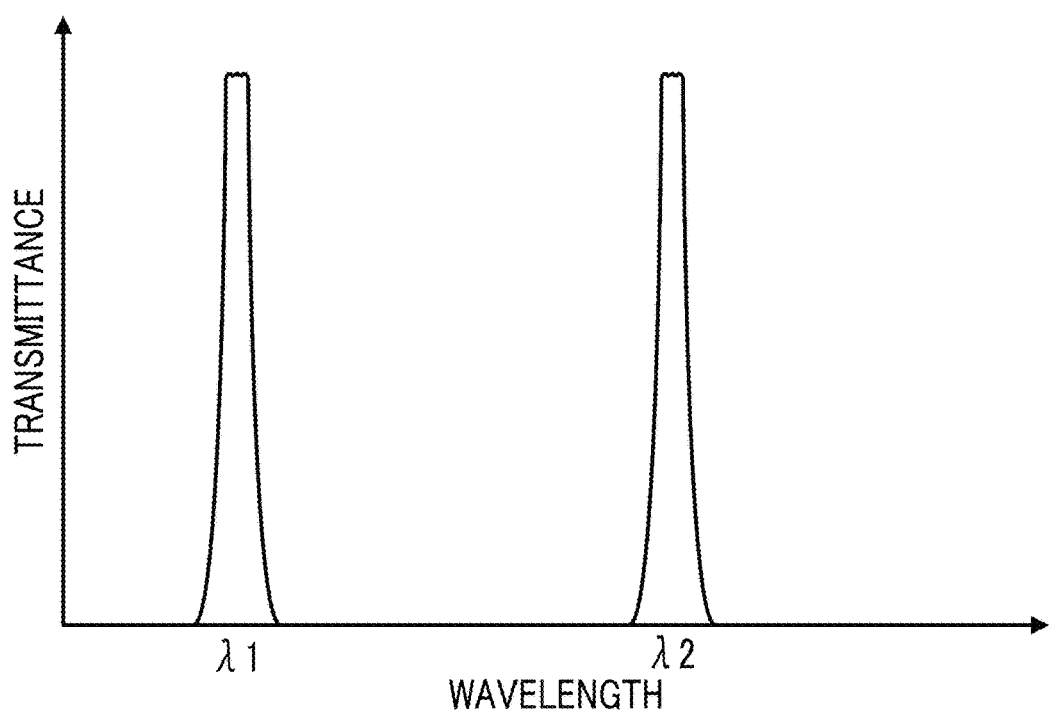
FIG. 3 is a graph showing transmission wavelength characteristics of each of a first bandpass filter and a second bandpass filter in the bandpass filter unit shown in FIG. 2.

FIG. 3 is a graph showing transmission wavelength characteristics of each of the first bandpass filter 16B1 and the second bandpass filter 16B2.

The first bandpass filter 16B1 transmits the light in the first wavelength range $\lambda 1$ and the second bandpass filter 16B2 transmits the light in the second wavelength range $\lambda 2$. A representative wavelength of the first wavelength range $\lambda 1$ is shorter than a representative wavelength of the second wavelength range $\lambda 2$ transmitting the second bandpass filter 16B2.

Therefore, the first bandpass filter 16B1 of the bandpass filter unit 16 transmits the light in the first wavelength range $\lambda 1$ from the first pupil region near the optical axis L of the imaging optical system 10, and the second bandpass filter 16B2 transmits the light in the second wavelength range $\lambda 2$ from the second pupil region far from the optical axis L of the imaging optical system 10.

By the way, due to dispersion characteristics of glass, a normal lens has a property (axial chromatic aberration) that an image is formed closer (on an object side) as a ray has a shorter wavelength. On the other hand, in a lens having various aberration characteristics, an image-forming position shifts depending on a position of the pupil.

Figure 4A:
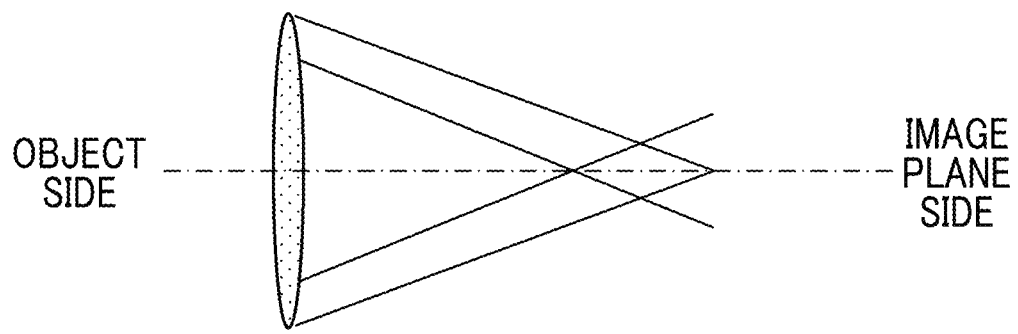
FIGS. 4A and 4B are diagrams used to explain a sign of a spherical aberration.
Figure 4B:
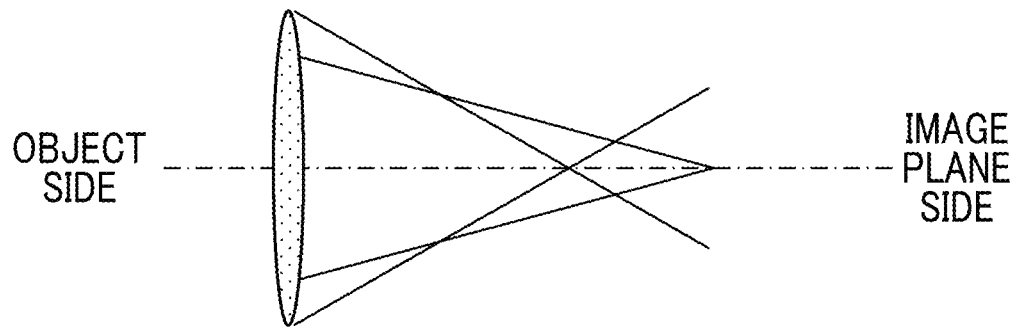

For example, in a case of a lens having a positive spherical aberration as shown in FIG. 4A (in a case of (A)), as farther away from the optical axis of the lens in a peripheral direction, the image-forming position further shifts toward an image plane side. In addition, in a case of a lens having a negative spherical aberration as shown in FIG. 4B (in a case of (B)), as farther away from the optical axis of the lens in the peripheral direction, the image-forming position shifts toward the object side.

The imaging optical system 10 of the present example is a lens having a negative spherical aberration, and thus the image-forming position shifts toward the object side as farther away from the optical axis of the lens in the peripheral direction. In the imaging optical system 10, this characteristic of spherical aberration is used to reduce the axial chromatic aberration as shown below.

(1) Due to the axial chromatic aberration of the imaging optical system 10, an image-forming position of the light in the first wavelength range $\lambda 1$ shifts toward the object side with respect to an image-forming position of the light in the second wavelength range $\lambda 2$.

(2) Due to the negative spherical aberration of the imaging optical system 10, the image-forming position shifts toward the object side as luminous flux incident on the imaging optical system 10 moves away from the optical axis L in the peripheral direction.

Therefore, the bandpass filter unit 16 is configured such that the first bandpass filter 16B1 transmitting the light in the first wavelength range $\lambda 1$ is provided in the circular opening region 16A1 (region near the optical axis L) of the frame 16A, and the second bandpass filter 16B2 transmitting the light in the second wavelength range $\lambda 2$ is provided in the annular opening region 16A2 (region far from the optical axis L) of the frame 16A.

As a result, the imaging optical system 10 is realized in which the deviation of the image-forming position due to the aberrations of (1) and (2) described above is offset and the axial chromatic aberration is satisfactorily corrected.

In a case where the imaging optical system has a positive spherical aberration, contrary to the bandpass filter unit 16 shown in FIG. 2, the first bandpass filter 16B1 is provided in the annular opening region 16A2 far from the optical axis L, and the second bandpass filter 16B2 is provided in the circular opening region 16A1 near the optical axis L.

FIG. 5 is a front view of the polarization filter unit shown 18 in FIG. 1.

The polarization filter unit 18 constitutes a part of the pupil division optical system which divides light passing through two pupil regions (bandpass filters 16B1 and 16B2) into pupils and causes the light to be incident on two types of pixels (first pixel and second pixel) included in the imaging element 100.

Similar to the bandpass filter unit 16, the polarization filter unit 18 is provided such that the center thereof consists with the optical axis L of the imaging optical system 10, and is composed of a frame 18A and two polarization filters 18B1 and 18B2.

The frame 18A of the polarization filter unit 18 has the same projected shape as the frame 16A of the bandpass filter unit 16, and includes a circular opening region 18A1 divided by a concentric circle centered on the optical axis L and an annular opening region 18A2.

The polarization filter 18B1 is disposed in the circular opening region 18A1 of the frame 18A, and the polarization filter 18B2 is disposed in the annular opening region 18A2.

Here, the polarization filter 18B1 (first polarization filter) polarizes the light passing through the first pupil region in a first direction, and the polarization filter 18B2 (second polarization filter) polarizes the light passing through the second pupil region in a second direction different from the first direction. That is, the two polarization filters 18B1 and 18B2 differ in the direction of polarization axes by 90° from each other, and in FIG. 5, a direction of the polarization axis of the polarization filter 18B1 is a left-right direction (x-axis direction) on an xy plane orthogonal to the optical axis L (z-axis), and a direction of the polarization axis of the polarization filter 18B2 is a vertical direction (y-axis direction).

In the following, as necessary, one opening region 18A1 provided in the frame 18A is referred to as a first opening region 18A1 and the other opening region 18A2 is referred to as a second opening region 18A2 to distinguish between the two opening regions 18A1 and 18A2. In addition, the polarization filter 18B1 provided in the first opening region 18A1 is referred to as a first polarization filter 18B1 and the polarization filter 18B2 provided in the second opening region 18A2 is referred to as a second polarization filter 18B2 to distinguish between the two polarization filters 18B1 and 18B2 having different polarization axes.

In the imaging optical system 10 having the above-described configuration, the pupil region is divided into two regions by the bandpass filter unit 16 and the polarization filter unit 18. That is, it is divided into the first pupil region defined by the first opening region 16A1 of the bandpass filter unit 16 and the first opening region 18A1 of the polarization filter unit 18 and the second pupil region defined by the second opening region 16A2 of the bandpass filter unit 16 and the second opening region 18A2 of the polarization filter unit 18.

Light having different characteristics is emitted from the first pupil region and the second pupil region. That is, from the first pupil region, the first light in the first wavelength range λ1, having the polarization direction of x direction, is emitted, and from the second pupil region, the second light in the second wavelength range λ2, having the polarization direction of y direction, is emitted.

[Imaging Element]

Figure 6:
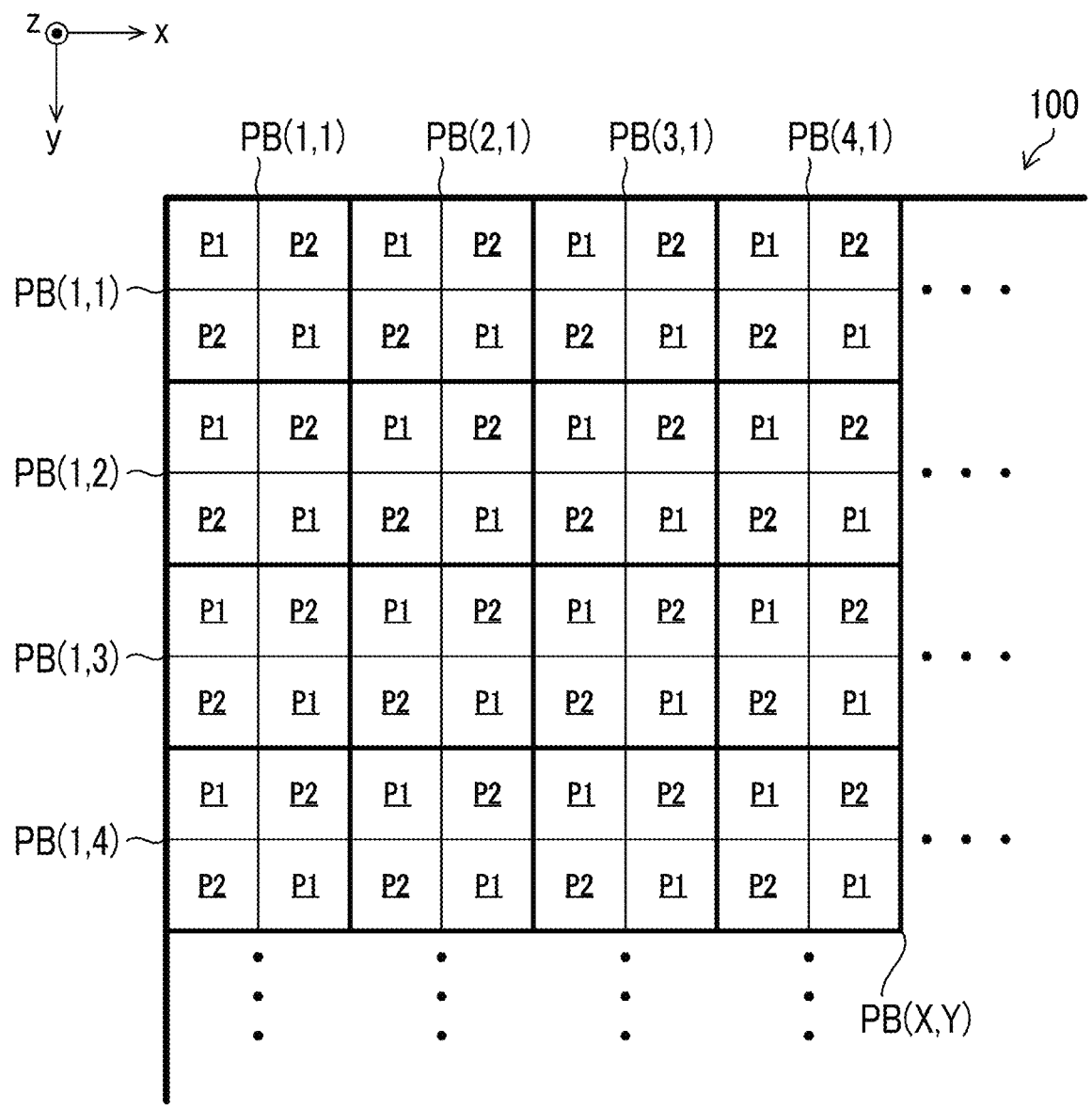
FIG. 6 is a diagram showing a schematic configuration of an array of pixels of an imaging element shown in FIG. 1.

FIG. 6 is a diagram showing a schematic configuration of an array of pixels of the imaging element 100 shown in FIG. 1.

As shown in the figure, the imaging element 100 has a plurality of types (two types) of pixels P1 and P2 on a light-receiving surface thereof. The pixels P1 and P2 are regularly arranged at a constant pitch along a horizontal direction (x-axis direction) and a vertical direction (y-axis direction).

In the imaging element 100 according to the present example, one pixel block PB(X,Y) is composed of four adjacent (2×2) pixels P1 and P2, and the pixel blocks PB(X,Y) are regularly arranged along the horizontal direction (x-axis direction) and the vertical direction (y-axis direction). Hereinafter, as necessary, the pixel P1 is referred to as a first pixel P1 and the pixel P2 is referred to as a second pixel P2 to distinguish between the pixels P1 and P2. The pixels P1 and P2 have different optical characteristics.

Figure 7:
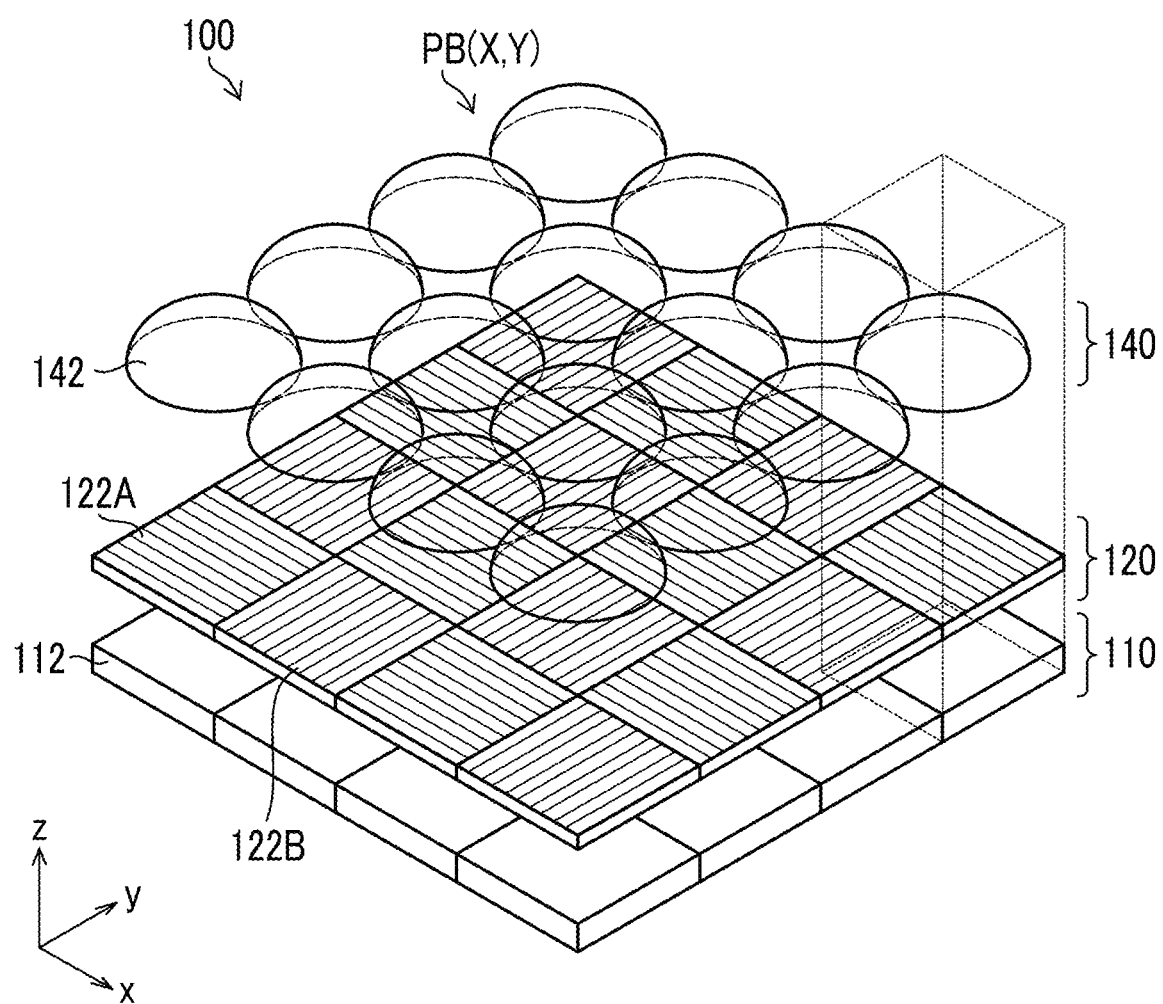
FIG. 7 a diagram showing a schematic configuration of the imaging element shown in FIG. 1.
Figure 8:
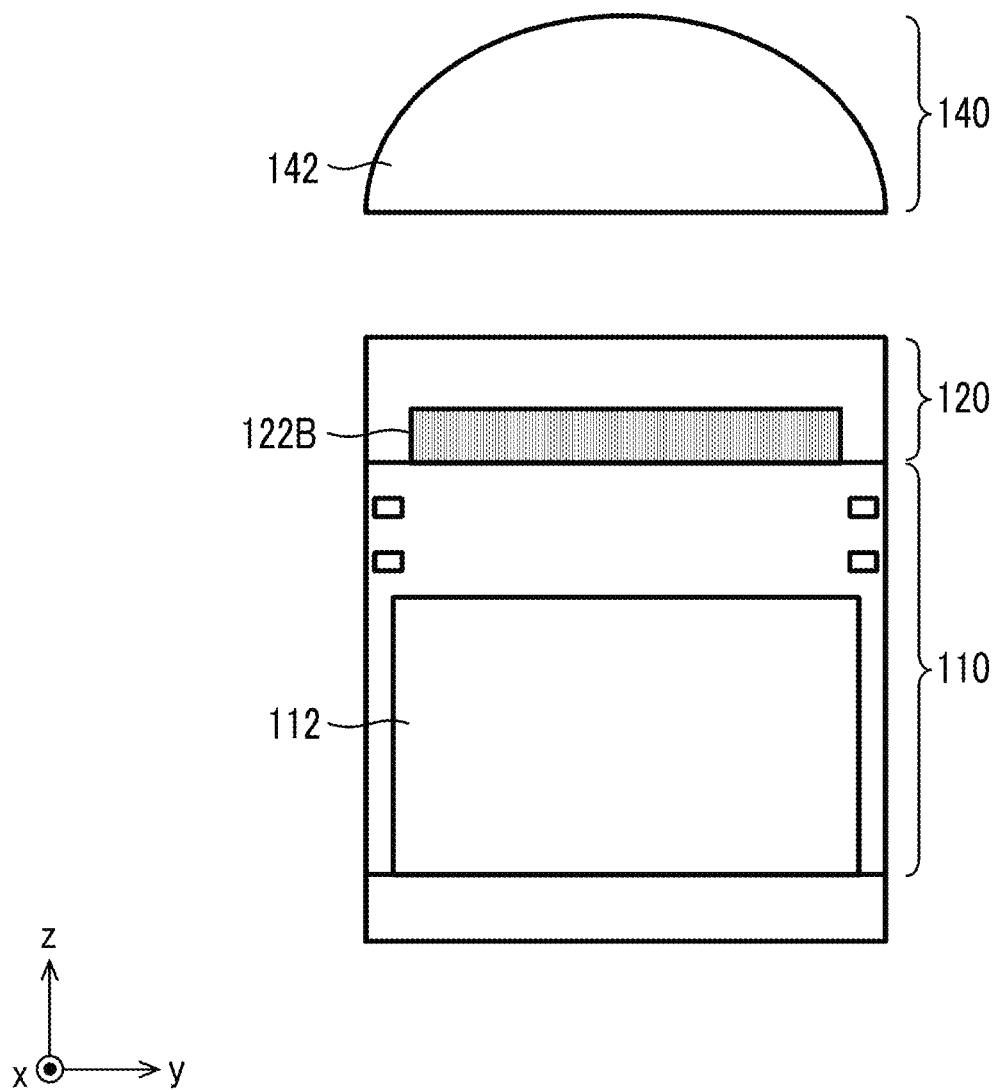
FIG. 8 is a cross-sectional view showing a schematic configuration of one pixel (broken line portion in FIG. 7) shown in FIG. 7.

FIG. 7 a diagram showing a schematic configuration of the imaging element 100 shown in FIG. 1, and FIG. 8 is a cross-sectional view showing a schematic configuration of one pixel (broken line portion in FIG. 7) shown in FIG. 7.

The imaging element 100 is a complementary metal-oxide semiconductor (CMOS) type image sensor, and includes a pixel array layer 110, a polarization filter element array layer 120, and a microlens array layer 140. Each layer is arranged in the order of the pixel array layer 110, the polarization filter element array layer 120, and the microlens array layer 140 from the image plane side to the object side. The imaging element 100 is not limited to the CMOS type, and may be an XY address type or charge coupled device (CCD) type image sensor.

The pixel array layer 110 is composed of a large number of photodiodes 112 arranged two-dimensionally. One photodiode 112 constitutes one pixel. The photodiodes 112 are regularly arranged along the horizontal direction (x direction) and the vertical direction (y direction).

The polarization filter element array layer 120 is composed of two types of polarization filter elements 122A and 122B having different polarization directions from each other, which are arranged two-dimensionally.

Hereinafter, as necessary, the polarization filter element 122A is referred to as a first polarization filter element 122A and the polarization filter element 122B is referred to as a second polarization filter element 122B to distinguish between the polarization filter elements 122A and 122B. Each of the polarization filter elements 122A and 122B is disposed at the same interval as the photodiodes 112 and is included in each pixel.

Figure 9:
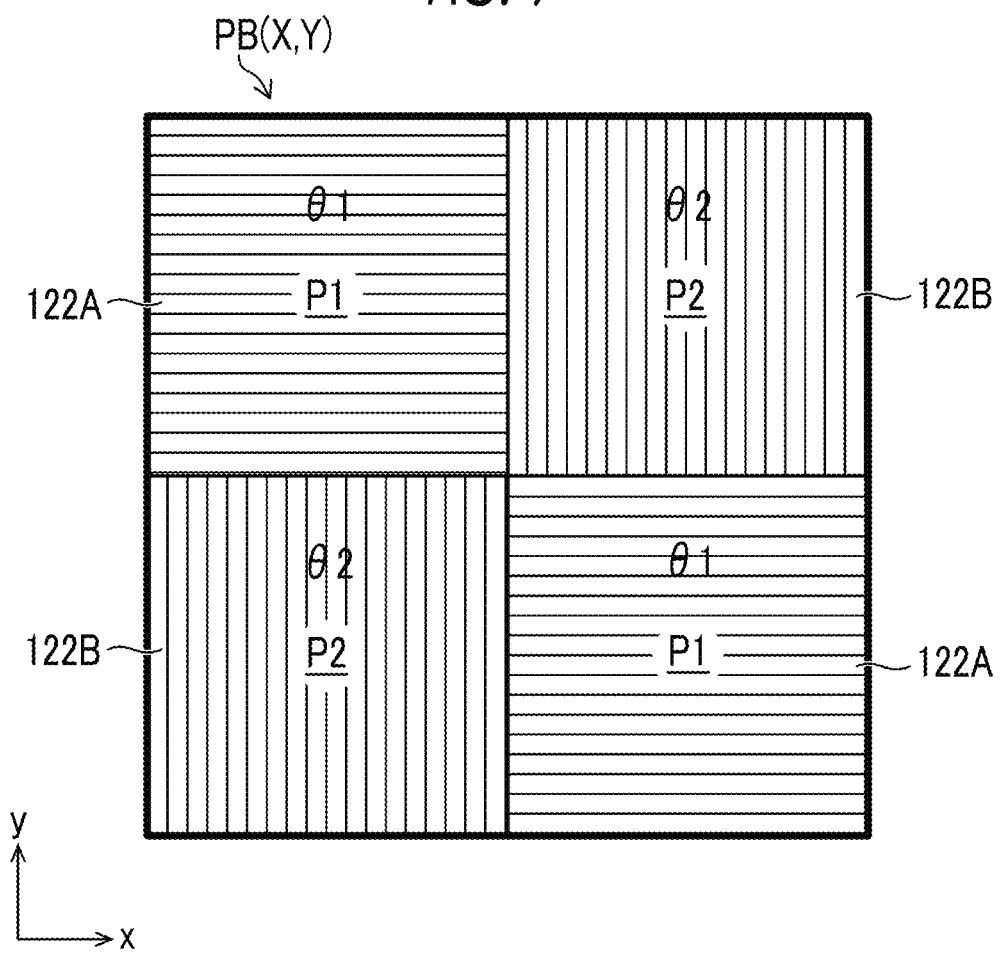
FIG. 9 is a diagram showing an example of an arrangement pattern of polarization filter elements included in each pixel block of the imaging element.

FIG. 9 is a diagram showing an example of an arrangement pattern of polarization filter elements included in each pixel block of the imaging element 100.

As shown in the figure, the two polarization filters 18B1 and 18B2 differ in direction of polarization axes by 90° from each other, and in FIG. 9, a direction (first polarization direction Θ1) of the polarization axis of the first polarization filter element 122A is a left-right direction (x-axis direction), and a direction of the polarization axis of the second polarization filter element 122B is a vertical direction (y-axis direction). In each pixel block PB(X,Y), the polarization filter elements 122A and 122B are regularly arranged.

The first polarization direction Θ1 of the first polarization filter element 122A coincides with the polarization direction of the first polarization filter 18B1 in the polarization filter unit 18 (FIG. 5), and the second polarization direction Θ2 of the second polarization filter element 122B coincides with the polarization direction of the second polarization filter 18B2 in the polarization filter unit 18.

Therefore, the first pixel P1 having the polarization filter element 122A in the imaging element 100 receives only the first light in the first wavelength range λ1 transmitted through the first pupil region having the first polarization filter 18B1, and the second pixel P2 having the polarization filter element 122B receives only the second light in the second wavelength range λ2 transmitted through the second pupil region having the second polarization filter 18B2.

In a case where the imaging device 1 receives a shooting instruction input from a shutter release switch or the like, the imaging device 1 performs exposure control in the imaging element 100. An optical image of a subject captured on the light-receiving surface of the imaging element 100 by the exposure control is converted into an electric signal by the imaging element 100. In each of the pixels (first pixel and second pixel) of the imaging element 100, charges corresponding to an amount of light incident on the photodiode 112 are accumulated, and an electric signal corresponding to an amount of charge accumulated in each pixel is read out from the imaging element 100 as an image signal, and the image signal is output.

Returning to FIG. 1, the signal processing unit 200 processes the signal output from the imaging element 100, and generates each of a first image of the first wavelength range λ1 and a second image of the second wavelength range λ2 based on the output signal of the first pixel P1 and the output signal of the second pixel P2.

As a result, the imaging device 1 can simultaneously capture the first image of the first wavelength range λ1 and the second image of the second wavelength range λ2 (multispectral image), and the first image and the second image are images having different wavelength ranges from each other, but are captured as images in which the axial chromatic aberration of the imaging optical system 10 is improved.

[Another Embodiment of Bandpass Filter Unit]

Figure 10:
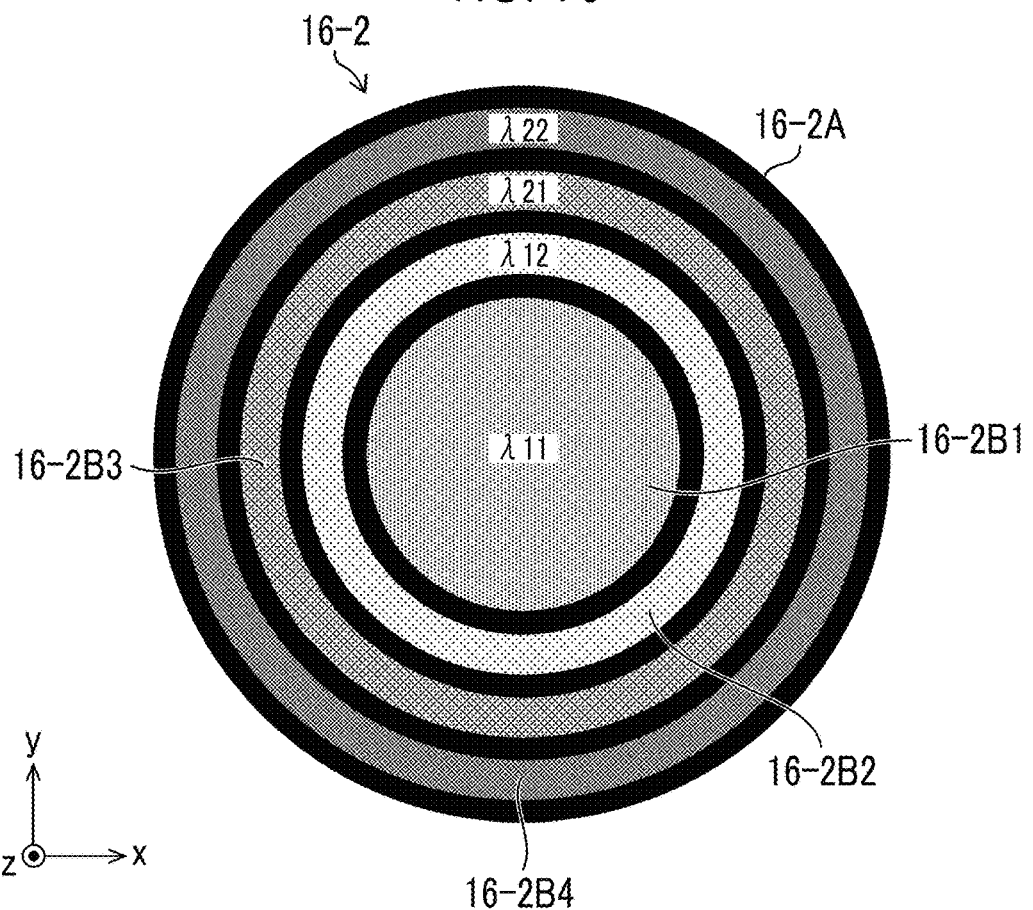
FIG. 10 is a front view showing another embodiment of the bandpass filter unit.

FIG. 10 is a front view showing another embodiment of the bandpass filter unit.

A bandpass filter unit 16-2 shown in FIG. 10 is an example of a first pupil region for passing light in a first wavelength range λ11, a second pupil region for passing light in a second wavelength range λ12, a third pupil region for passing light in a third wavelength range λ21, and a fourth pupil region for passing light in a fourth wavelength range λ22, and functions as a wavelength selective unit which transmits light in a wavelength range different for each of the pupil regions of the first pupil region to the fourth pupil region.

The bandpass filter unit 16-2 is provided such that the center coincides with the optical axis of the imaging optical system, and is composed of a frame 16-2A including a circular opening region divided by a concentric circle centered on the optical axis and three annular opening regions, and a first wavelength selective filter to fourth wavelength selective filter (four bandpass filters) 16-2B1 to 16-2B4 provided in the frame 16-2A.

Figure 11:
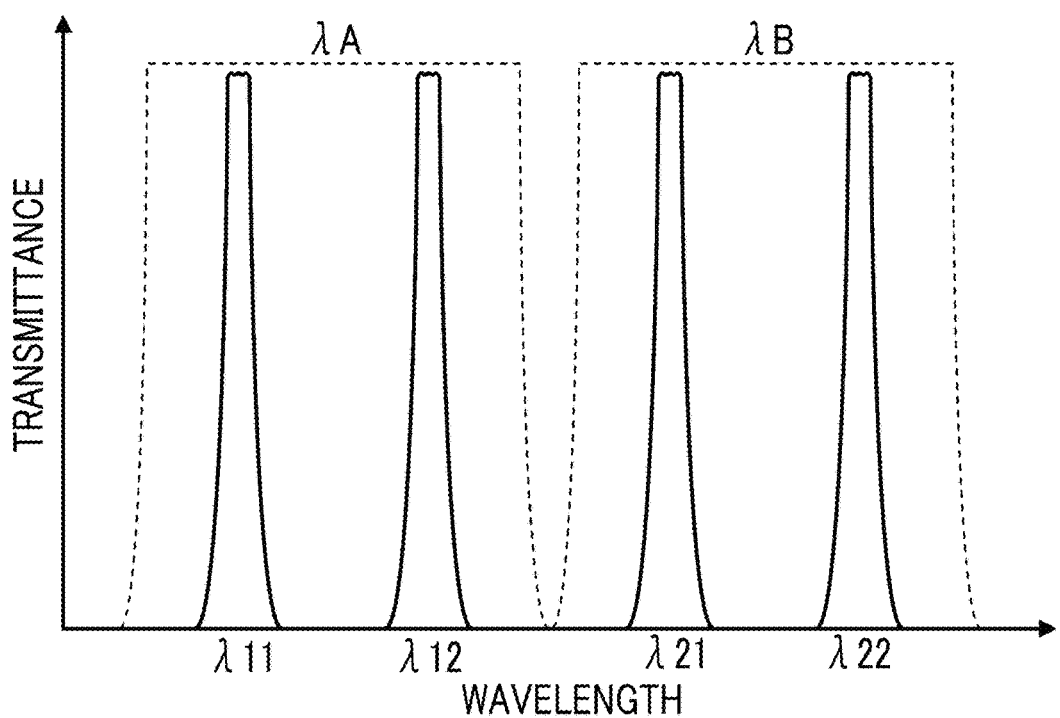
FIG. 11 is a graph showing transmission wavelength characteristics of each of the four bandpass filters of the bandpass filter unit shown in FIG. 10.

FIG. 11 is a graph showing transmission wavelength characteristics of each of the four bandpass filters 16-2B1 to 16-2B4 of the bandpass filter unit 16-2 shown in FIG. 10.

The bandpass filter 16-2B1 transmits the light in the first wavelength range λ11, the bandpass filter 16-2B2 transmits the light in the second wavelength range λ12, the bandpass filter 16-2B3 transmits the light in the third wavelength range λ21, and the bandpass filter 16-2B4 transmits the light in the fourth wavelength range λ22.

Here, the bandpass filter 16-2B1 which transmits the light in the first wavelength range λ11, which has the shortest representative wavelength of the four wavelength ranges, is provided in the circular pupil region of the bandpass filter unit 16-2 closest to the optical axis, and the bandpass filters 16-2B2 to 16-2B4 which transmit the light in the second wavelength range λ12, the third wavelength range λ21, and the fourth wavelength range λ22, in which the representative wavelengths are sequentially lengthened, are provided in the three annular pupil regions sequentially distant from the optical axis. That is, the bandpass filters 16-2B1 to 16-2B4 which transmit the light in the first wavelength range λ11 to the fourth wavelength range λ22, in which the representative wavelengths are sequentially lengthened as the distance from the optical axis increases, are provided in the bandpass filter unit 16-2.

Due to the axial chromatic aberration of the imaging optical system, as a wavelength of subject light is shorter, an image-forming position shifts toward an object side. However, since the imaging optical system has a negative spherical aberration, and the bandpass filters 16-2B1 to 16-2B4 which transmit the light in the first wavelength range λ11 to the fourth wavelength range λ22, in which the representative wavelengths are sequentially lengthened, are provided in the first pupil region to fourth pupil region sequentially distant from the optical axis L, an imaging optical system capable of satisfactorily correcting the axial chromatic aberration is configured by offsetting the deviation of an image-forming position due to the axial chromatic aberration by the deviation of an image-forming position due to the spherical aberration.

Figure 12:
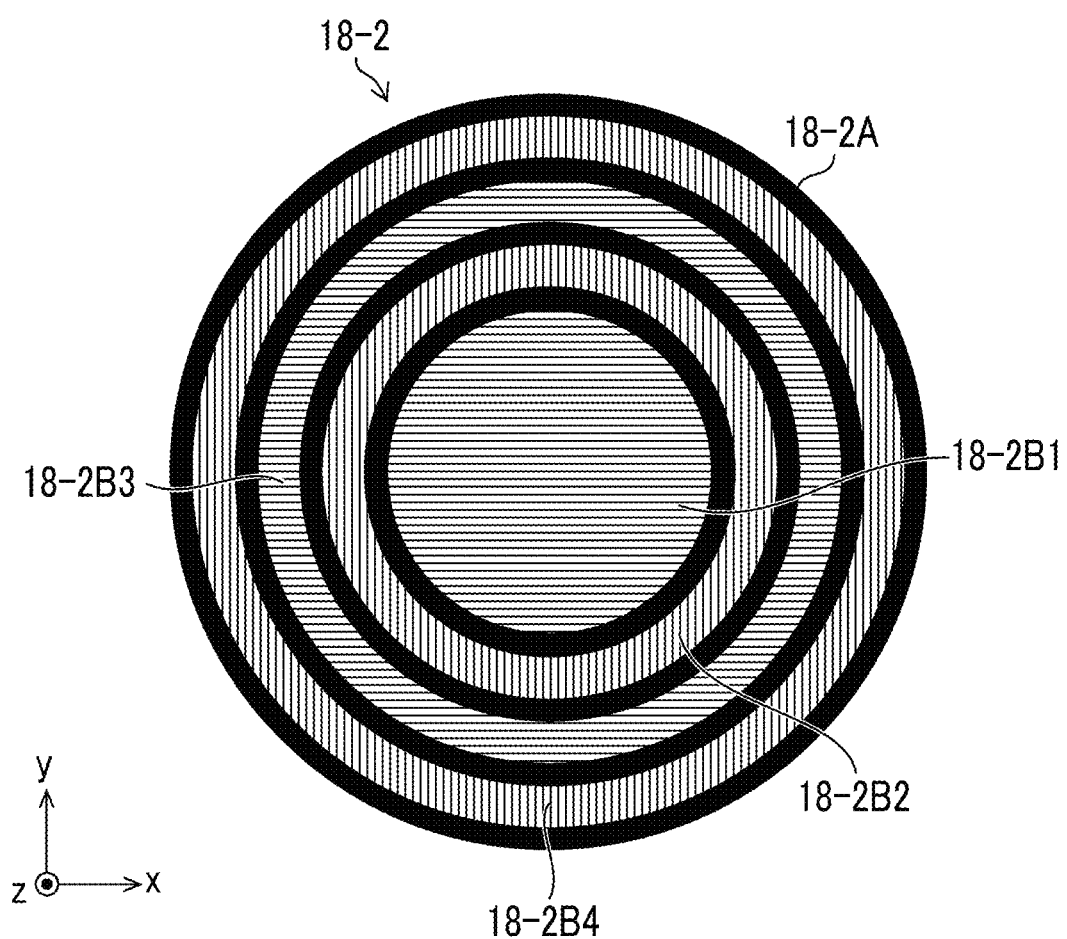
FIG. 12 is a front view of a polarization filter unit provided corresponding to the bandpass filter unit shown in FIG. 10.

FIG. 12 is a front view of a polarization filter unit 18-2 provided corresponding to the bandpass filter unit 16-2 shown in FIG. 10.

The polarization filter unit 18-2 constitutes a part of the pupil division optical system which divides light passing through four pupil regions (bandpass filters 16-2B1 to 16-2B4) into pupils and causes the light to be incident on four types of pixels (first pixel to fourth pixel) included in an imaging element 100-2.

Similar to the bandpass filter unit 16-2, the polarization filter unit 18-2 is provided such that the center thereof consists with the optical axis of the imaging optical system, and is composed of a frame 18-2A and four polarization filters 18-2B1 to 18-2B4.

The frame 18-2A of the polarization filter unit 18-2 has the same projected shape as the frame 16-2A of the bandpass filter unit 16-2, and includes a circular opening region divided by a concentric circle centered on the optical axis and three annular opening regions.

The polarization filter 18-2B1 is disposed in the circular opening region of the frame 18-2A, and the three polarization filters 18-2B2 to 18-2B4 are arranged in the three annular opening regions.

Here, in FIG. 12, among four polarization filters 18-2B1 to 18-2B4, polarization axes of two polarization filters 18-2B1 and 18-2B3 are in a left-right direction (x-axis direction), and polarization axes of the remaining two polarization filters 18-2B2 and 18-2B4 are in a vertical direction (y-axis direction). In addition, in FIG. 12, the polarization filters 18-2B1 and 18-2B3 and the polarization filters 18-2B2 and 18-2B4 differ in the direction of polarization axes by 90° from each other.

The bandpass filter unit 16-2 shown in FIG. 10 transmits light in the four wavelength ranges λ11, λ12, λ21, and λ22 from the four pupil regions, respectively, and by the polarization filter unit 18-2, the light in the four wavelength ranges λ11, λ12, λ21, and λ22 is emitted as a first light in the wavelength ranges λ11 and λ21 in which the polarization direction is the x-direction, and as a second light in the wavelength ranges λ12 and λ22 in which the polarization direction is the y-direction.

Figure 13:
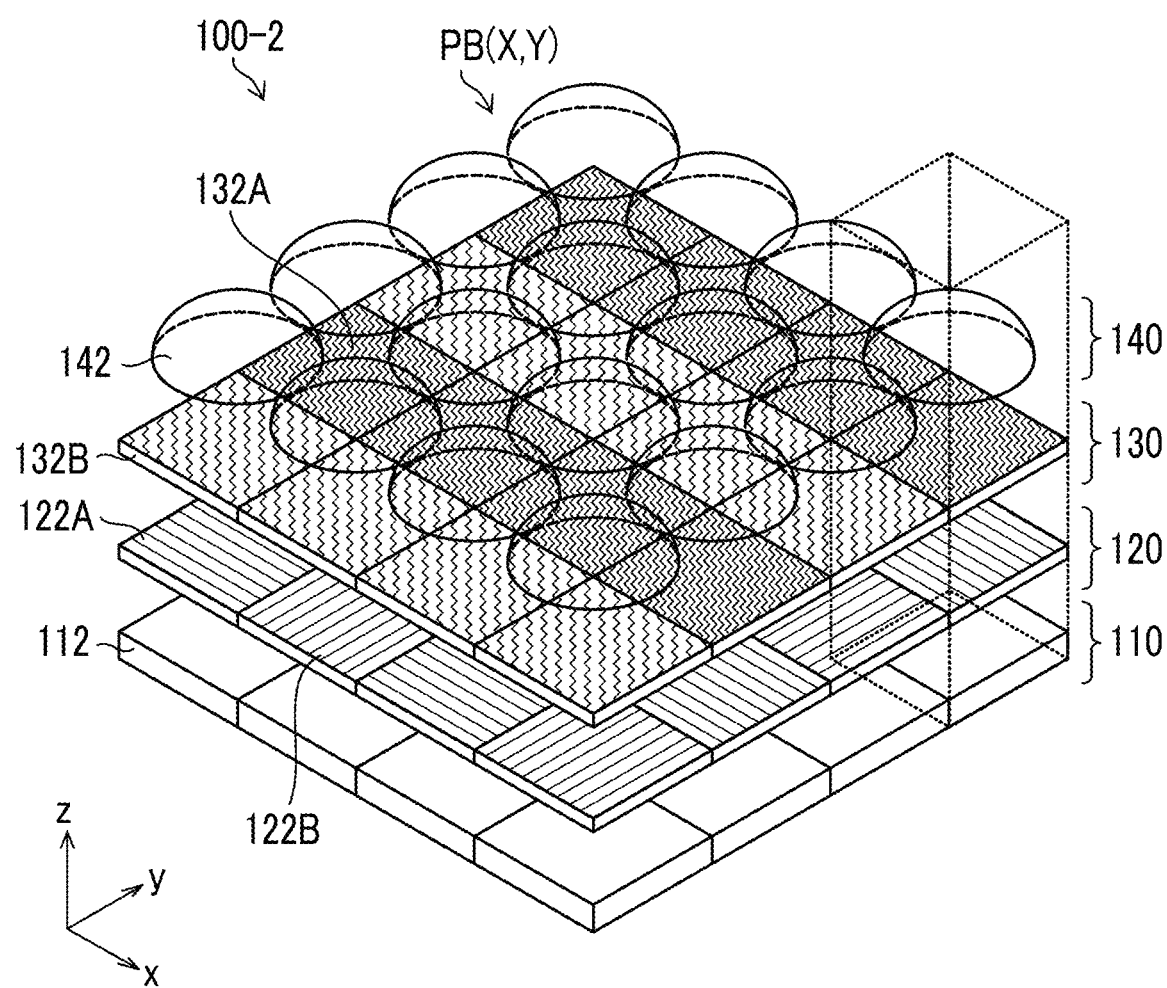
FIG. 13 is a diagram showing a schematic configuration of another imaging element applied to the imaging device according to the embodiment of the present invention.
Figure 14:
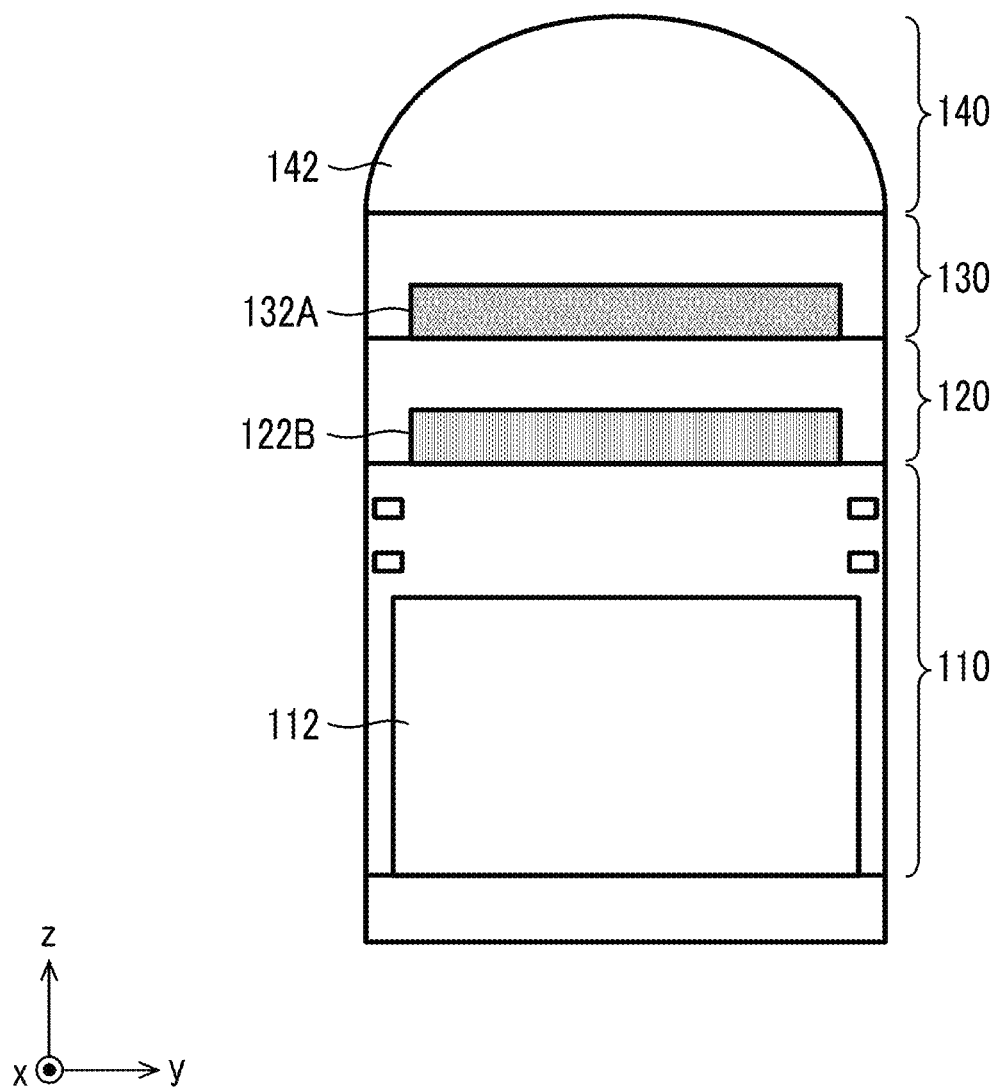
FIG. 14 is a cross-sectional view showing a schematic configuration of one pixel (broken line portion in FIG. 13) shown in FIG. 13.

FIG. 13 is a diagram showing a schematic configuration of another imaging element applied to the imaging device according to the embodiment of the present invention. FIG. 14 is a cross-sectional view showing a schematic configuration of one pixel (broken line portion in FIG. 13) shown in FIG. 13. Components shown in FIGS. 13 and 14 common to the portion of the imaging element shown in FIGS. 7 and 8 will be denoted by the same reference numerals, and the detailed description thereof will be omitted.

The imaging element 100-2 shown in FIGS. 13 and 14 differs from the imaging element 100 shown in FIG. 7 in that a spectral filter element array layer 130 which functions as a first wavelength selective filter and a second wavelength selective filter is added.

The spectral filter element array layer 130 is composed of two types of spectral filter elements 132A and 132B (first wavelength selective filter and second wavelength selective filter) having different transmission wavelength characteristics from each other, which are arranged two-dimensionally. Hereinafter, as necessary, the spectral filter element 132A is referred to as a first spectral filter element 132A and the spectral filter element 132B is referred to as a second spectral filter element 132B to distinguish between the spectral filter elements 132A and 132B. Each of the spectral filter elements 132A and 132B is disposed at the same interval as the photodiodes 112 and is included in each pixel.

FIG. 11 is a graph including an example of transmission wavelength characteristics of each spectral filter element.

As shown in FIG. 11, the first spectral filter element 132A transmits light in a wavelength range kA, and the second spectral filter element 132B transmits light in a wavelength range B.

The first light in the wavelength ranges λ11 and λ21 in which the polarization direction is the x-direction and the second light in the wavelength ranges λ12 and λ22 in which the polarization direction is the y-direction are incident on the imaging element 100-2.

On the other hand, among pixels of the imaging element 100-2, in a case where a pixel having the first spectral filter element 132A and the first polarization filter element 122A is defined as a pixel P1, a pixel having the first spectral filter element 132A and the second polarization filter element 122B is defined as a pixel P2, a pixel having the second spectral filter element 132B and the first polarization filter element 122A is defined as a pixel P3, and a pixel having the second spectral filter element 132B and the second polarization filter element 122B is defined as a pixel P4, in the imaging element 100-2, one pixel block PB(X,Y) is composed of four adjacent (2×2) pixels P1, P2, P3, and P4, and the pixel blocks PB(X,Y) are regularly arranged along the horizontal direction (x-axis direction) and the vertical direction (y-axis direction).

Hereinafter, as necessary, the pixels P1, P2, P3, and P4 are referred to as a first pixel P1, a second pixel P2, a third pixel P3, and a fourth pixel P4 to distinguish between the four types of pixels P1, P2, P3, and P4.

By the combination of the polarization filter elements 122A and 122B and the spectral filter elements 132A and 132B, the four types of pixels P1 to P4 receive only light in any one of the four wavelength ranges λ11 to λ22. That is, the first pixel P1 receives only the light in the wavelength range λ11, the second pixel P2 receives only the light in the wavelength range λ12, the third pixel P3 receives only the light in the wavelength range λ21, and the fourth pixel P4 receives only the light in the wavelength range λ22.

In a case where the imaging device receives a shooting instruction input from a shutter release switch or the like, the imaging device performs exposure control in the imaging element 100-2. An optical image of a subject captured on the light-receiving surface of the imaging element 100-2 by the exposure control is converted into an electric signal by the imaging element 100-2. In each of the pixels (pixels P1 to P4) of the imaging element 100-2, charges corresponding to an amount of light incident on the photodiode 112 are accumulated, and an electric signal corresponding to an amount of charge accumulated in each pixel is read out from the imaging element 100-2 as an image signal, and the image signal is output.

The signal processing unit 200 shown in FIG. 1 processes the signal output from the imaging element 100-2, and generates each of a first image of the first wavelength range λ11, a second image of the second wavelength range λ12, a third image of the third wavelength range λ21, and a fourth image of the fourth wavelength range λ22, based on the output signal of the first pixel P1, the output signal of the second pixel P2, the output signal of the third pixel P3, and the output signal of the fourth pixel P4.

As a result, the imaging device can simultaneously capture the first image of the first wavelength range λ11, the second image of the second wavelength range λ12, the third image of the third wavelength range λ21, and the fourth image of the fourth wavelength range λ22 (multispectral image), and the first image to the fourth image are images having different wavelength ranges from each other, but are captured as images in which the axial chromatic aberration of the imaging optical system is improved.

[Variation of Bandpass Filter Unit Corresponding to Aberration Type of Imaging Optical System]

FIGS. 15 to 17 are diagrams showing aberration types of the imaging optical system and variations of a bandpass filter unit corresponding to the aberration type, respectively.

As the aberration types of the imaging optical system applicable to the correction of the axial chromatic aberration of the imaging optical system, a spherical aberration, a coma aberration, and an astigmatism can be considered.

In order to correct the axial chromatic aberration of the imaging optical system, the imaging optical system may be designed so that aberrations other than the axial chromatic aberration of the imaging optical system are positively generated.

As a method of realizing an imaging optical system having the spherical aberration as the aberrations other than the axial chromatic aberration, it is considered that, for an imaging optical system in which the spherical aberration is well corrected, a surface spacing or curvature near the stop is changed to generate the spherical aberration.

In addition, as a method of realizing an imaging optical system having the coma aberration, it is considered that the coma aberration is generated by eccentricity of lens near the stop, and as a method of realizing an imaging optical system having the astigmatism, it is considered that the astigmatism is generated by providing an anamorphic lens near the stop.

<Principle of Correction of Axial Chromatic Aberration>

1) Due to dispersion characteristics of glass, a normal lens has a property that an image is formed closer to an object side as a ray has a shorter wavelength (axial chromatic aberration).

2) In a lens with residual aberration, an image-forming position shifts depending on a position of the pupil.

As shown in "Aberration characteristics" of FIG. 15(A), it is assumed that the spherical aberration, the coma aberration, or the astigmatism remains in the lens of the imaging optical system.

In the "Aberration characteristics" of FIG. 15(A), a region a1 is a region in which a phase advances to a region b1 of the imaging optical system, and assuming that a region el is a region el in which the phase is delayed, the image-forming position approaches the image plane side in the order of the regions a1, b1, and c1.

Therefore, in order to correct the axial chromatic aberration, as shown in "Wavelength allocation image" of FIG. 15(B) corresponding to the "Aberration characteristics" of FIG. 15(A), bandpass filters having different wavelength ranges are assigned to each of pupil regions a2, b2, and c2 corresponding to the regions a1, b1, and c1. That is, bandpass filters having a longer wavelength, in which light transmits in the order of the regions a2, b2, and c2, are arranged.

In a case where the bandpass filters having different wavelength ranges transmitted are appropriately arranged corresponding to the "Wavelength allocation image" of FIG. 15(B), it is possible to realize an imaging optical system in which the deviation of the image-forming position due to the influences of 1) and 2) is offset and the axial chromatic aberration is satisfactorily corrected.

<Bandpass Filter Unit in which Spherical Aberration is Used to Reduce Axial Chromatic Aberration>

As a variation of the bandpass filter unit in which the spherical aberration is used to reduce the axial chromatic aberration, six bandpass filter units shown in "Concentric circle type" of FIG. 15(C), "Circular opening vertical 3-hole type" of FIG. 15(D), "Circular opening cross 5-hole type" of FIG. 15(E), "Circular opening vertical 5-hole type" of FIG. 16(F), "Circular opening cross 9-hole type" of FIG. 16(G), and "Circular opening 8-direction and 9-hole type" of FIG. 16(H) are shown in FIGS. 15 and 16.

In a case where the imaging optical system having the spherical aberration has the characteristics (characteristics of negative spherical aberration) shown in the "Aberration characteristics" of FIG. 15(A), in order to correct the axial chromatic aberration, as shown in the "Wavelength allocation image" of FIG. 15(B), the bandpass filters having a longer wavelength, in which light transmits in the order of the regions a2, b2, and c2 sequentially distant from the optical axis, are arranged.

The "Concentric circle type" of FIG. 15(C) is a bandpass filter unit of the same type as the bandpass filter unit 16 shown in FIG. 2 and the bandpass filter unit 16-2 shown in FIG. 10.

The bandpass filter units shown in the "Circular opening vertical 3-hole type" of FIG. 15(D), "Circular opening cross 5-hole type" of FIG. 15(E), and "Circular opening 8 direction and 9-hole type" of FIG. 16(H) have a circular opening with a visible white filter or no filter in the circular opening on the optical axis, and the bandpass filters transmitting light in a wavelength range in which a representative wavelength is longer than a representative wavelength of visible white are arranged in a plurality of circular openings equidistant from the optical axis. According to these bandpass filter units, it is possible to simultaneously capture an image in the wavelength range of visible white and an image in the wavelength range having a longer representative wavelength than the representative wavelength of visible white, and to improve focusing accuracy of each image even for each image having different wavelength ranges.

In the "Circular opening vertical 5-hole type" of FIG. 16(F) and "Circular opening cross 9-hole type" of FIG. 16(G), a bandpass filter transmitting light in the first wavelength range with a short wavelength is disposed in the center, a bandpass filter transmitting light in the second wavelength range with a long wavelength is disposed on the outermost surface, and in the middle thereof, a third pupil region transmitting light in the third wavelength range intermediate between the first wavelength range and the second wavelength range is provided.

In these six bandpass filter units, in a case where the spherical aberration is negative, the bandpass filters having a longer wavelength are arranged as they are sequentially distant from the optical axis. In this way, by arranging the bandpass filters for each wavelength range in consideration of the spherical aberration of the imaging optical system, the deviation of the image-forming position for each wavelength due to the axial chromatic aberration is reduced, and focusing accuracy of a plurality of images captured at the same time is improved.

In a case of an imaging optical system having a positive spherical aberration, which is different from the imaging optical system having the negative spherical aberration characteristics shown in FIG. 15(A), bandpass filters having a shorter wavelength, in which light transmits in the order of regions sequentially distant from the optical axis, are arranged.

<Bandpass Filter Unit in which Coma Aberration is Used to Reduce Axial Chromatic Aberration>

As a variation of the bandpass filter unit in which the coma aberration is used to reduce the axial chromatic aberration, ten bandpass filter units shown in "Circular opening vertical 3-hole type" of FIG. 15(D), "Circular opening cross 5-hole type" of FIG. 15(E), "Circular opening vertical 5-hole type" of FIG. 16(F), "Circular opening cross 9-hole type" of FIG. 16(G), "Circular opening 8-direction and 9-hole type" of FIG. 16(H), "Square opening 2×2 type" of FIG. 16(J), "Square opening 8-hole rhombus type" of FIG. 17(K), "Square opening 3×3 type" of FIG. 17(L), "Square opening cross type" of FIG. 17(M), "Fan-shaped 4-split type" of FIG. 17(N), and "Fan-shaped 8-split type" of FIG. 17(O) are shown in FIGS. 15 to 17.

In a case where the imaging optical system having the coma aberration has the characteristics shown in the "Aberration characteristics" of FIG. 15(A), among a region a2 (first region) and a region c2 (second region) which are located, with the optical axis in between, opposite to each other through a straight line intersecting the optical axis of the imaging optical system, an image-forming position of light incident on the region a2 on the optical axis is moved to an image side, an image-forming position of light incident on the region c2 on the optical axis is moved to an object side.

Therefore, in order to correct the axial chromatic aberration, as shown in the "Wavelength allocation image" of FIG. 15(B), bandpass filters having a longer wavelength, in which light transmits in the order of the regions a2, b2, and c2 from bottom to top in FIG. 15, are arranged.

In the bandpass filter unit of the "Circular opening vertical 3-hole type" of FIG. 15(D), in which the coma aberration is used to reduce the axial chromatic aberration, bandpass filters having a longer wavelength, in which light transmits into three circular openings from bottom to top in FIG. 15, are arranged.

According to the "Wavelength allocation image" of FIG. 15(B), due to the influence of the coma aberration, an image-forming position shifts toward an object side from bottom to top, but by applying a bandpass filter unit having a bandpass filter in which the wavelength is longer sequentially from the bottom to the top, it is possible to offset the deviation of the image-forming position due to the axial chromatic aberration and obtain a good image in which the deviation of the image-forming position for each wavelength is reduced.

Similarly, in the other bandpass filter units, bandpass filters having a longer transmitted wavelength is sequentially arranged in each opening from the bottom to the top.

In a case of an imaging optical system having a coma aberration, which is different from the imaging optical system having the coma aberration characteristics shown in FIG. 15(A), it is necessary to determine the placement position of a plurality of bandpass filters having different transmitted wavelengths according to the characteristics of the coma aberration.

<Bandpass Filter Unit in which Astigmatism is Used to Reduce Axial Chromatic Aberration>

As a variation of the bandpass filter unit in which the astigmatism is used to reduce the axial chromatic aberration, ten bandpass filter units shown in "Circular opening cross 5-hole type" of FIG. 15(E), "Circular opening cross 9-hole type" of FIG. 16(G), "Circular opening 8-direction and 9-hole type" of FIG. 16(H), "Circular opening astigmatism special type" of FIG. 16(I), "Square opening 2×2 type" of FIG. 16(J), "Square opening 8-hole rhombus type" of FIG. 17(K), "Square opening 3×3 type" of FIG. 17(L), "Square opening cross type" of FIG. 17(M), "Fan-shaped 4-split type" of FIG. 17(N), and "Fan-shaped 8-split type" of FIG. 17(O) are shown in FIGS. 15 to 17.

In a case where the imaging optical system having the astigmatism has the characteristics shown in the "Aberration characteristics" of FIG. 15(A), an image-forming position of light incident on left and right regions (first region), which is symmetrical with respect to the optical axis of the imaging optical system, on the optical axis is moved to an image side, and an image-forming position of light incident on upper and lower regions (second region), which are symmetrical with respect to the optical axis and orthogonal (including a case of being approximately orthogonal) to the left and right regions, on the optical axis is moved to an object side.

Therefore, in order to correct the axial chromatic aberration, as shown in the "Wavelength allocation image" of FIG. 15(B), bandpass filters having a longer wavelength, in which light transmits in the order of the left and right regions a2, a central region b2, and the upper and lower regions c2 in FIG. 15, are arranged.

In the bandpass filter unit of the "Circular opening cross 5-hole type" of FIG. 15(E), in which the astigmatism is used to reduce the axial chromatic aberration, with respect to bandpass filters arranged in the central (on the optical axis) circular opening in FIG. 15, bandpass filters having a shorter wavelength are arranged in the left and right circular openings, and bandpass filters having a shorter wavelength are arranged in the upper and lower circular openings.

In a case of the "Circular opening cross 9-hole type" of FIG. 16(G), as the distance from the center to the left and right directions increases, bandpass filters having a shorter transmitted wavelength are sequentially arranged than the central bandpass filter, and as distance from the center to the upper and lower directions increases, bandpass filters having a longer transmitted wavelength are sequentially arranged than the central bandpass filter.

In a case of the "Circular opening 8-direction and 9-hole type" of FIG. 16(H), five circular openings in an oblique direction, including the center, are different from the "Circular opening cross 5-hole type" of FIG. 15(E) in that the same bandpass filter is disposed as the bandpass filter disposed in the central circular opening.

In a case of the "Circular opening astigmatism special type" of FIG. 16(I), the bandpass filter is not disposed in the center, and in twelve circular openings formed along sides of a rhombus, bandpass filters having a shorter wavelength are sequentially arranged as they move away from a straight line in a vertical direction passing through the optical axis in a horizontal direction.

The bandpass filter units shown in the "Square opening 2×2 type" of FIG. 16(J) and "Fan-shaped 4-split type" of FIG. 17(N) have an opening with a visible white filter or no filter in the left and right openings, and the bandpass filters transmitting light in a wavelength range in which a representative wavelength is longer than a representative wavelength of visible white are arranged in the upper and lower openings.

Similarly, in the other bandpass filter units, bandpass filters having a shorter transmitted wavelength are arranged as the distance increases in the left and right direction, and bandpass filters having a longer transmitted wavelength are arranged as the distance increases in the upper and lower direction.

In a case of an imaging optical system having an astigmatism, which is different from the imaging optical system having the astigmatism characteristics shown in FIG. 15(A), it is necessary to determine the position and region of a plurality of bandpass filters having different transmitted wavelengths according to the characteristics of the astigmatism.

Example

Figure 18:
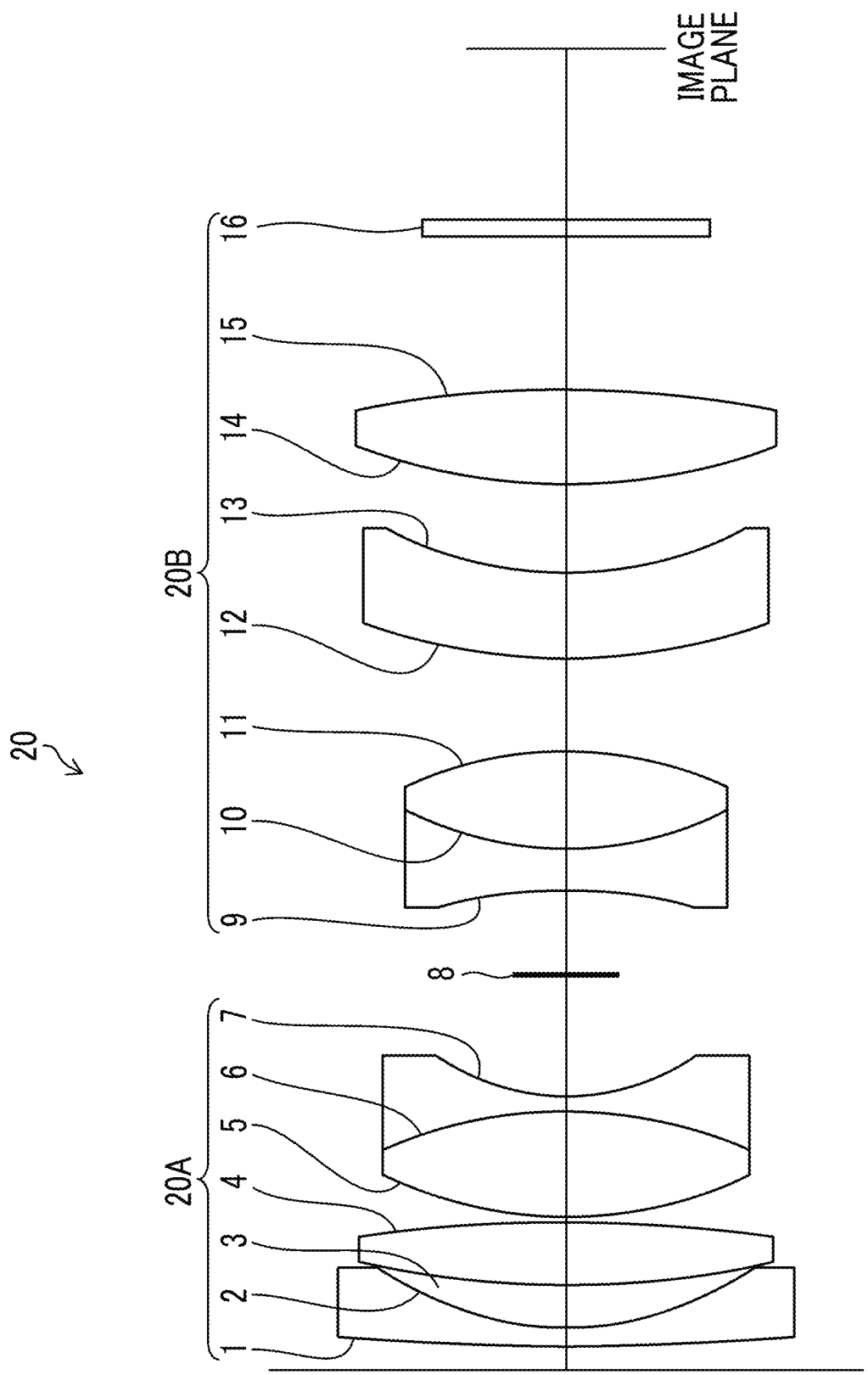
FIG. 18 is a cross-sectional view showing an example of the imaging optical system to which the present invention is applied.

FIG. 18 is a cross-sectional view showing an example of the imaging optical system to which the present invention is applied.

An imaging optical system 20 shown in FIG. 18 includes a front lens group 20A disposed closer to an object side than a position of a stop represented by a plane number 8, and a rear lens group 20B disposed closer to an image side than the position of the stop.

In FIG. 18, 1 to 7 represent plane numbers for four lenses constituting the front lens group 20A, and 9 to 16 represent plane numbers for four lenses constituting the rear lens group 20B and plane numbers for a parallel flat plate.

FIG. 19 is a chart showing lens data of the imaging optical system 20 shown in FIG. 18.

Figure 20:
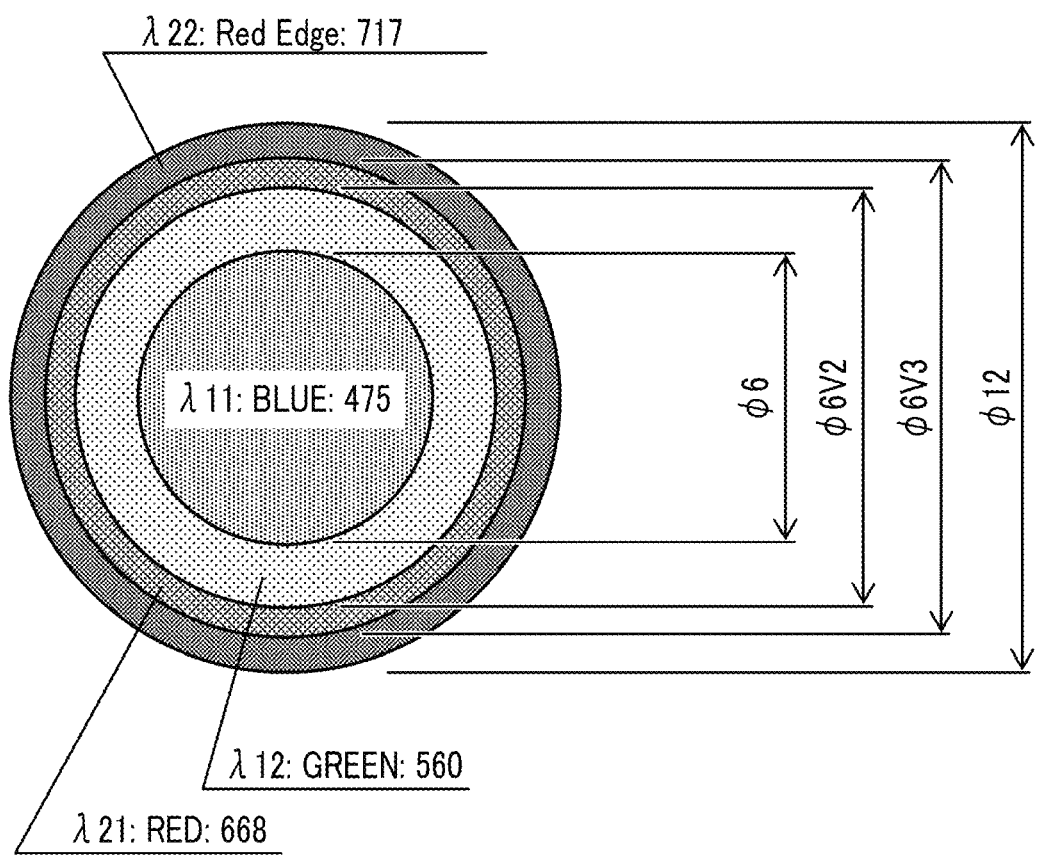
FIG. 20 is a front view showing a configuration of a bandpass filter unit applied to the imaging optical system shown in FIG. 19.

FIG. 20 is a front view showing a configuration of a bandpass filter unit applied to the imaging optical system 20 shown in FIG. 19.

A bandpass filter unit 16-3 shown in FIG. 20 is disposed between the front lens group 20A and the rear lens group 20B of the imaging optical system 20 shown in FIG. 18, and for example, the bandpass filter unit 16-3 can be disposed on the position of the stop shown in FIG. 18 and functions as a fixed stop, or can be disposed on a position adjacent to the stop.

The bandpass filter unit 16-3 is a bandpass filter unit is a "Concentric circle type" bandpass filter unit same as the bandpass filter unit 16-2 shown in FIG. 10, and is composed of a bandpass filter transmitting light having a representative wavelength 111 (blue: 475 nm), a bandpass filter transmitting light having a representative wavelength λ12 (green: 560 nm), a bandpass filter transmitting light having a representative wavelength λ21 (red: 668 nm), and a bandpass filter transmitting light having a representative wavelength λ22 (red edge: 717 nm), which are provided in one circular opening region and three annular opening regions, divided by four concentric circles having diameters of 6 mm, 6√2 mm, 6√3 mm, and 12 mm, respectively.

The imaging optical system 20 of the present example includes a polarization filter unit (corresponding to the polarization filter unit 18-2 shown in FIG. 12) corresponding to the bandpass filter unit 16-3.

Figure 21:
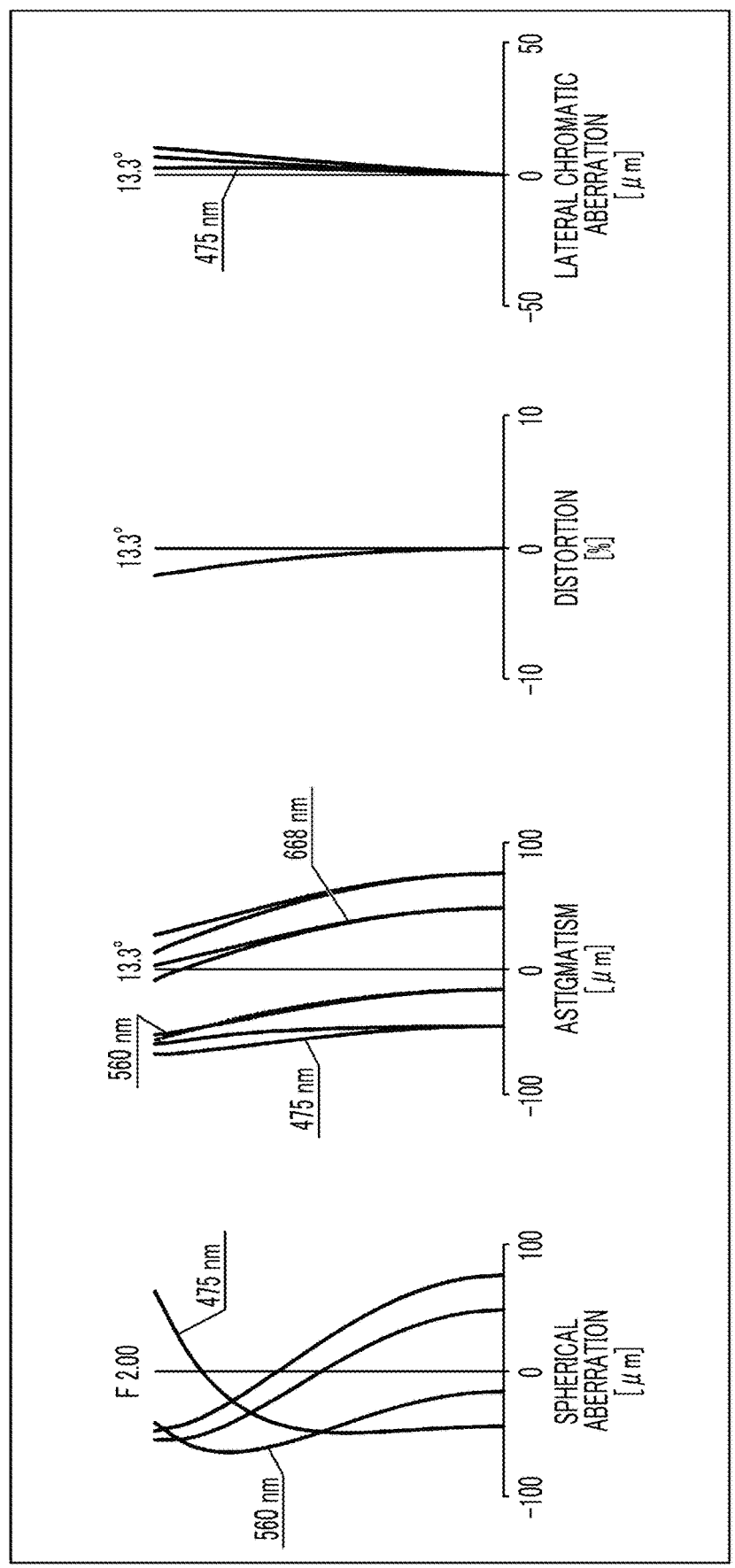
FIG. 21 is a graph showing a spherical aberration, an astigmatism, a distortion, and a lateral chromatic aberration of the imaging optical system shown in FIG. 18.

FIG. 21 is a graph showing a spherical aberration, an astigmatism, a distortion, and a lateral chromatic aberration of the imaging optical system 20 shown in FIG. 18.

FIG. 22 is a chart showing changes in axial chromatic aberration of the imaging optical system 20 in a case where the bandpass filter unit 16-3 is not provided in the imaging optical system 20 and in a case where the bandpass filter unit 16-3 is provided in the imaging optical system 20.

The axial chromatic aberration shown in FIG. 22 indicates a deviation amount of image-forming positions of other wavelengths with respect to the wavelength λ12 (560 nm), and a negative value indicates a deviation amount toward the object side. In addition, these deviation amounts are measured based on an image-forming position in which a modulation transfer function (MFT) at a spatial frequency of 73 [lp/mm] takes a peak value.

As shown in FIG. 22, by disposing the bandpass filter unit 16-3 in the imaging optical system 20, it can be seen that the axial chromatic aberration due to the imaging optical system 20 is reduced.

[Features of Imaging Optical System]

Next, features of the imaging optical system including the imaging device according to the present invention, particularly having various aberrations will be quantitatively described.

First, various variables, parameters, and the like related to the imaging optical system are defined as follows.

n represents an integer of 2 or more, i represents a parameter which changes in a range of 1 to n, Ωi represents an i-th pupil region in the imaging optical system, $\lambda_{ij}$ represents a representative wavelength of light transmitted the i-th pupil region Ωi, $m_i$ represents the number of representative wavelengths in the i-th pupil region Ωi, j represents a parameter which changes in a range of 1 to m, $\lambda_{ij}$ represents a j-th representative wavelength in the i-th pupil region Ωi, f(λ) represents a paraxial focal length of the imaging optical system at a wavelength λ, g(x,y;λ) represents an on-axis longitudinal aberration of the wavelength λ in a pupil coordinate (x,y) of the pupil region in the imaging optical system, and $S\Omega_i$ represents an area of the i-th pupil region Ωi.

Based on the above-described definition, $$|f(\lambda_{i_1 j_1}) - f(\lambda_{i_2 j_2})| > a \qquad \text{[expression 1]}$$

$$\left| \left\{ \frac{\iint_{\Omega_{i_1}} g(x_{i_1}, y_{i_1}; \lambda_{i_1 j_1}) dx_{i_1} dy_{i_1}}{S_{\Omega_{i_1}}} - \frac{\iint_{\Omega_{i_2}} g(x_{i_2}, y_{i_2}; \lambda_{i_2 j_2}) dx_{i_2} dy_{i_2}}{S_{\Omega_{i_2}}} \right\} - \{f(\lambda_{i_1 j_1}) - f(\lambda_{i_2 j_2})\} \right| < b \qquad \text{[expression 2]}$$

the imaging optical system has a combination of i1, i2, j1, and j2 satisfying [expression 1] and [expression 2] (where, a≥b).

[expression 1] means that the imaging optical system has an axial chromatic aberration exceeding a.

[expression 2] means that, by transmitting light at an appropriate wavelength for each position and region of the pupils of the imaging optical system, the axial chromatic aberration is reduced by the on-axis longitudinal aberration based on various aberrations of the imaging optical system, and the axial chromatic aberration exceeding a is less than b.

Here, in a case where a pixel pitch of the imaging element is defined as p, it is preferable that b in [expression 2] satisfies b≤8p.

Grounds for the 8p described above are as follows.

In a case where a permissible circle of confusion is defined as δ and an F number is defined as F, a focal depth of the imaging optical system can be expressed by ±δF. Here, in a case where F is 4, the focal depth is ±4δ.

In the permissible circle δ of confusion, in a case where a pixel pitch p of the imaging element is a half-Nyquist, δ=2p. Therefore, as the focal depth of the imaging optical system, ±4δ=±8p.

Therefore, by setting b≤8p, the axial chromatic aberration of the imaging optical system can be reduced within the focal depth of the imaging optical system.

In the permissible circle δ of confusion, in a case where the pixel pitch p of the imaging element is a full-Nyquist, it is more preferable that b≤4p.

In addition, in the pixel pitch of the imaging element used in the example, p=3.45 μm, and in this case, 8p=27.6 μm and 4p=13.8 μm. The axial chromatic aberration with a filter shown in FIG. 22 satisfies b≤4p.

[Regarding Off-Axis Luminous Flux Diameter on Stop]

FIG. 23 is a diagram used to explain an off-axis luminous flux diameter on the stop.

In a bandpass filter unit 16-4 shown in FIG. 23(A), in a case where off-axis luminous flux passes only inside a circle 17 as shown by a dotted line in FIG. 23(A), light at a wavelength assigned to the outermost shell at this angle of view cannot reach.

In this case, as shown in FIG. 23(B), an image of the wavelength assigned to the outermost shell is not captured in an edge part with a high image height. That is, an image circle is smaller.

Therefore, it is preferable to use an imaging optical system with a large image circle, so that the off-axis luminous flux can cover the outermost annular region, whereby, as shown in FIG. 23(C), the image of the wavelength assigned to the outermost shell is also captured up to the outermost edge part.

[Regarding Presence or Absence of Luminous Flux Regulation Other than Stop]

Figure 24A:
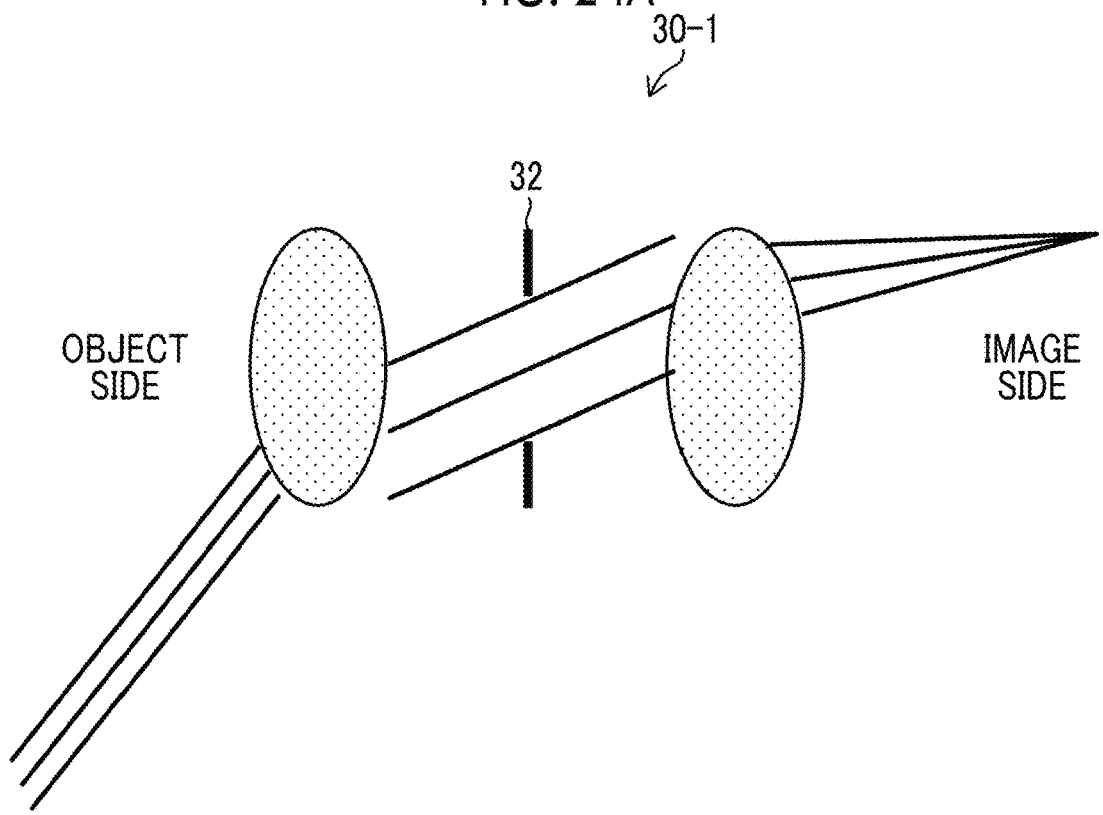
FIGS. 24A and 24B are diagrams used to explain the presence or absence of luminous flux regulation other than the stop.
Figure 24B:
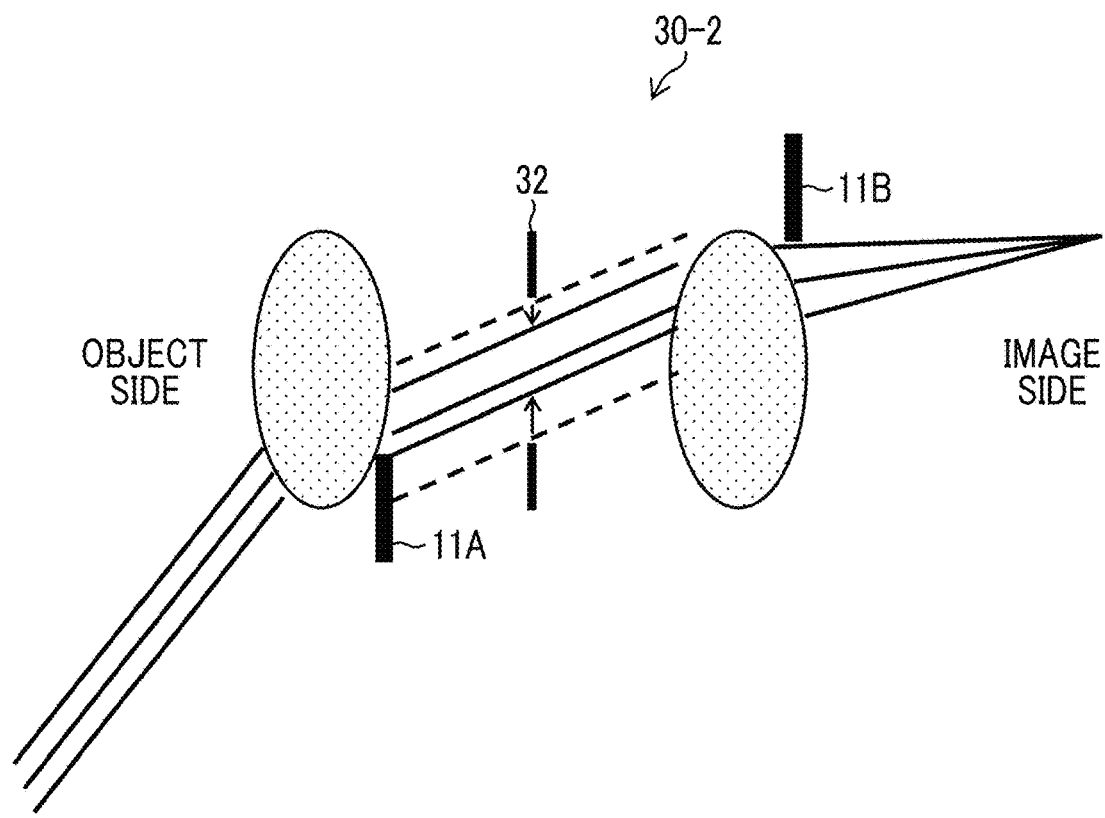

FIGS. 24A and 24B are diagrams used to explain the presence or absence of luminous flux regulation other than the stop.

FIG. 24A is a diagram showing an imaging optical system 30-1 in which luminous flux is regulated by a stop 32, and FIG. 24B is a diagram showing an imaging optical system 30-2 in which luminous flux is regulated in a point other than the stop 32.

As shown in FIG. 24B, in a case where there are regulation points 11A and 11B which regulate the luminous flux in addition to the stop 32, the off-axis luminous flux on the stop 32 is smaller than a stop diameter.

By removing (or minimizing) the regulation of the luminous flux other than the stop 32, the off-axis luminous flux diameter on the stop 32 can cover almost the entire area of the stop 32, and an image size can be the same for each annular region (for each wavelength range).

In a normal optical design, aberration is reduced by inserting a ray cut (luminous flux regulation other than the stop) to improve the performance.

As shown in FIG. 24A, by preventing ray from being cut except for the stop 32, normally, it is difficult to reduce the aberration, but in the present invention, since the axial chromatic aberration is corrected by utilizing the aberration, the desired performance can be realized even in a case where the ray cut is limited.

[Regarding Regulation 1 of Angle on Stop]

Figure 25:
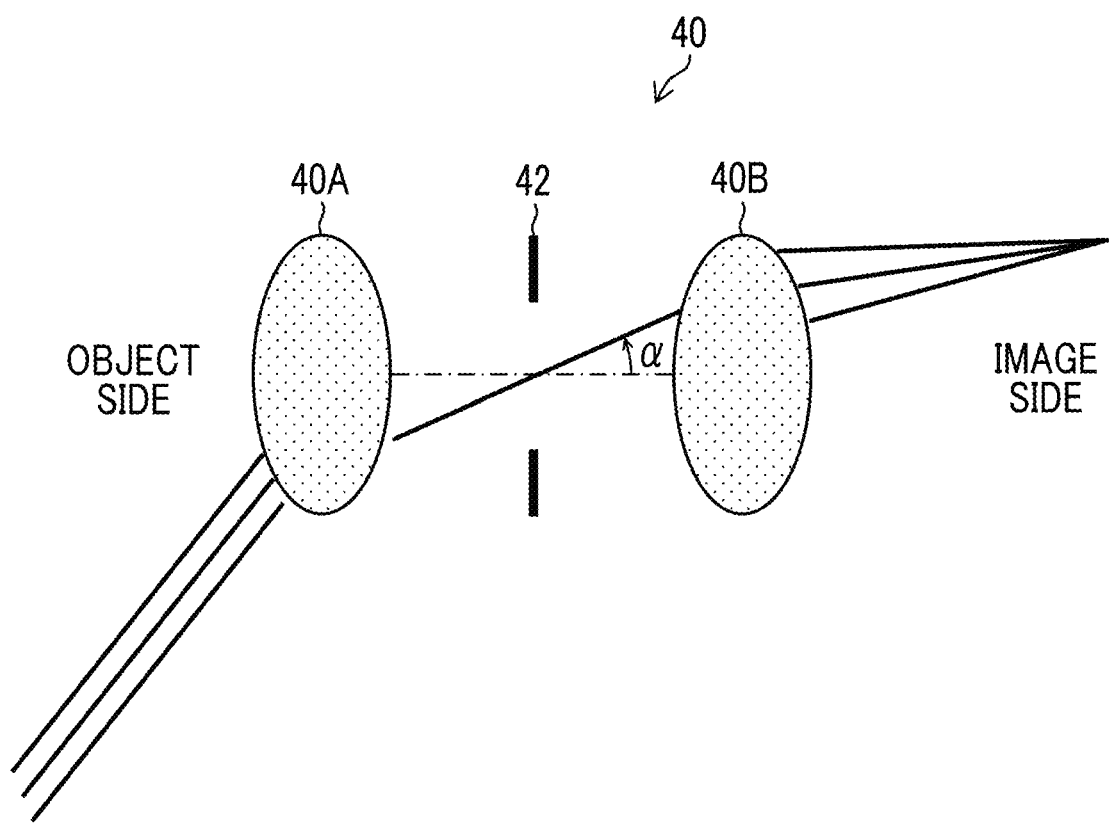
FIG. 25 is a diagram used to explain an angle of off-axis principal ray passing through the stop.

FIG. 25 is a diagram used to explain an angle of off-axis principal ray passing through the stop.

An imaging optical system 40 shown in FIG. 25 includes a front lens group 40A and a rear lens group 40B, and a stop plane 42 is disposed between the front lens group 40A and the rear lens group 40B.

As shown in FIG. 25, an angle α of off-axis principal ray passing through the stop plane 42 is determined by an angle of the ray and an angular magnification of the front lens group 40A.

In a case where the angular magnification of the front lens group 40A is small, the angle α of the off-axis principal ray passing through the stop plane 42 approaches perpendicular to the stop plane 42. As a result, an input angle of light incident on the stop plane 42 or a bandpass filter (not shown) disposed adjacent to the stop plane 42 can be reduced, and a wavelength shift due to a large incidence angle can be reduced.

[Regarding Regulation 2 of Angle on Stop]

Figure 26:
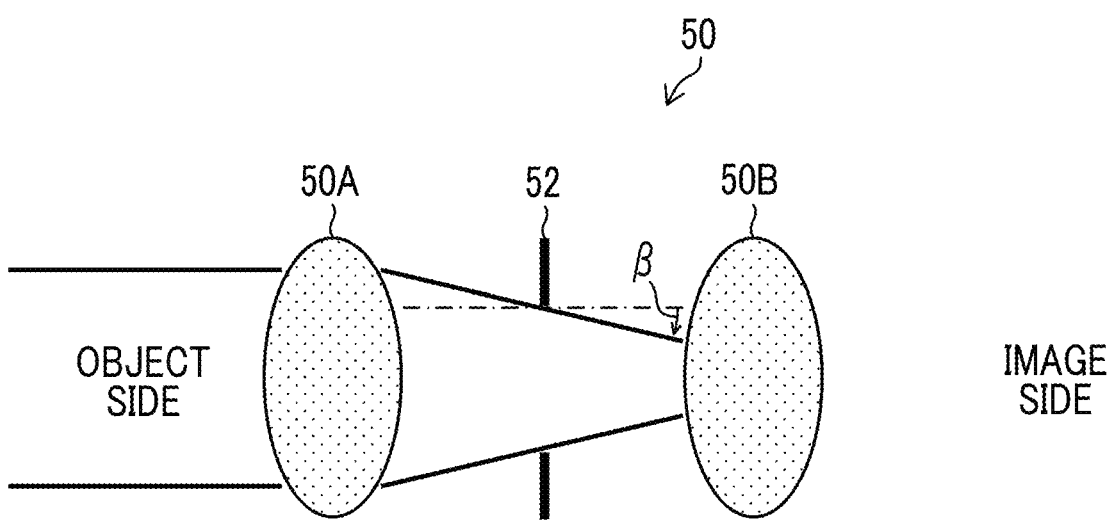
FIG. 26 is a diagram used to explain an angle of on-axis marginal ray passing through the stop.

FIG. 26 is a diagram used to explain an angle of on-axis marginal ray passing through the stop.

An imaging optical system 50 shown in FIG. 26 includes a front lens group 50A and a rear lens group 50B, and a stop plane 52 is disposed between the front lens group 50A and the rear lens group 50B.

As shown in FIG. 26, an angle 3 of on-axis marginal ray passing through the stop plane 52 is determined by a diameter of entrance pupil and a focal length of the front lens group 50A.

Therefore, the front lens group 50A has a focal length which makes the angle β of the on-axis marginal ray incident on the stop plane 52 close to perpendicular to the stop plane 52.

In a case where the focal length of the front lens group 50A is large, the angle β of the on-axis marginal ray passing through the stop plane 52 approaches perpendicular to the stop plane 52. As a result, the angle β (input angle) of the on-axis marginal ray incident on the stop plane 52 or a bandpass filter (not shown) disposed adjacent to the stop plane 52 can be reduced, and a wavelength shift due to a large incidence angle can be reduced.

[Other Methods for Acquiring Plurality of Images by Pupil Division]

<Method of Acquiring Three Images Using Polarization Filter>

Figure 27:
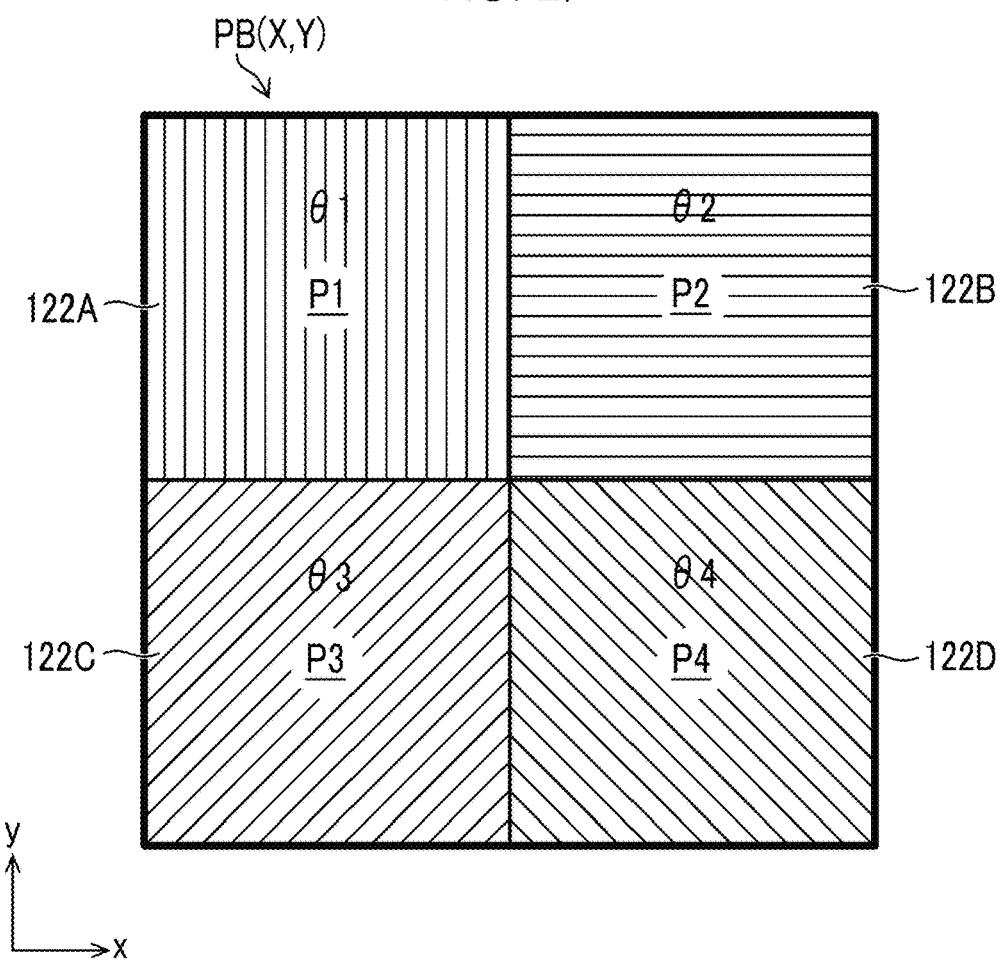
FIG. 27 is a diagram showing another example of an arrangement pattern of polarization filter elements included in each pixel block of the imaging element.

FIG. 27 is a diagram showing another example of an arrangement pattern of polarization filter elements included in each pixel block of the imaging element.

As shown in the figure, polarization filter elements 122A to 122D having different transmission polarization directions are provided in four pixels P1 to P4 constituting one pixel block PB(X,Y). Specifically, the first pixel P1 includes a first polarization filter element 122A (first polarization filter) transmitting light in a polarization direction Θ1 (for example, 90°). The second pixel P2 includes a second polarization filter element 122B (second polarization filter) transmitting light in a polarization direction Θ2 (for example, 0°). The third pixel P3 includes a third polarization filter element 122C (third polarization filter) transmitting light in a polarization direction Θ3 (for example, 45°). The fourth pixel P4 includes a fourth polarization filter element 122D (fourth polarization filter) transmitting light in a polarization direction Θ4 (for example, 135°).

In a case where the number of wavelength ranges selected by the bandpass filter unit is 3, a polarization filter unit having three types of polarization directions (for example, Θ1, Θ2, and Θ3) is provided corresponding to each pupil region of the bandpass filter unit.

Four image signals D1 to D4 are generated by separating and extracting pixel signals of the first pixel P1, the second pixel P2, the third pixel P3, and the fourth pixel P4 from each pixel block PB(X,Y) of the imaging element. However, interference (crosstalk) occurs in the four image signals. That is, since light for each wavelength range is incident on each of the pixels P1 to P4, the generated image is an image in which images of each wavelength range are mixed at a predetermined ratio.

Therefore, the signal processing unit 200 (FIG. 1) performs interference elimination processing to generate the image signal for each wavelength range.

Hereinafter, the interference elimination processing performed in the signal processing unit 200 will be described.

In each pixel block PB(X,Y), a pixel signal (signal value) obtained from the first pixel P1 is defined as x1, a pixel signal obtained from the second pixel P2 is defined as x2, and a pixel signal obtained from the third pixel P3 is defined as x3. The three pixel signals x1 to x3 are obtained from each pixel block PB(X,Y). The signal processing unit 200 calculates three pixel signals X1 to X3 corresponding to light in each wavelength range (for example, λ1, λ2, and λ3) from the three pixel signals x1 to x3 to eliminate interference. Specifically, by [expression 4] in which a matrix A of [expression 3] is used, the three pixel signals X1 to X3 corresponding to light in each of the wavelength ranges λ1, λ2, and λ3 to eliminate interference.

$$A = \begin{bmatrix} a11 & a12 & a13 \\ a21 & a22 & a23 \\ a31 & a32 & a33 \end{bmatrix} \qquad \text{[expression 3]}$$

$$\begin{bmatrix} X1 \\ X2 \\ X3 \end{bmatrix} = \begin{bmatrix} a11 & a12 & a13 \\ a21 & a22 & a23 \\ a31 & a32 & a33 \end{bmatrix} * \begin{bmatrix} x1 \\ x2 \\ x3 \end{bmatrix} \qquad \text{[expression 4]}$$

Hereinafter, a reason why the interference can be eliminated using [expression 4] described above will be described.

The interference occurs in a case where light from the pupil region of each wavelength range of each of the pixels P1 to P3 is mixed. A ratio (interference amount (also referred to as an interference rate)) in which the light incident on the pupil region of each wavelength range is received by each of the pixels (P1 to P3) is uniquely determined from a relationship between the polarization direction of the polarization filter unit provided in the pupil region for each wavelength range and the polarization direction of the polarization filter elements 122A to 122C provided in each of the pixels P1 to P3.

Here, in a case where a ratio (interference amount) in which the light incident on the first pupil region is received by the first pixel P1 is defined as b11, a ratio in which the light incident on the second pupil region is received by the first pixel P1 is defined as b12, and a ratio in which the light incident on the third pupil region is received by the first pixel P1 is defined as b13, X1, X2, X3, and x1 satisfy the following relationship.

$$b11*X1+b12*X2+b13*X3=x1 \quad \text{[expression 5]}$$

In addition, in a case where a ratio in which the light incident on the first pupil region is received by the second pixel P2 is defined as b21, a ratio in which the light incident on the second pupil region is received by the second pixel P2 is defined as b22, and a ratio in which the light incident on the third pupil region is received by the second pixel P2 is defined as b23, X1, X2, X3, and x2 satisfy the following relationship.

$$b21*X1+b22*X2+b23*X3=x2 \quad \text{[expression 6]}$$

In addition, in a case where a ratio in which the light incident on the first pupil region is received by the third pixel P3 is defined as b31, a ratio in which the light incident on the second pupil region is received by the third pixel P3 is defined as b32, and a ratio in which the light incident on the third pupil region is received by the third pixel P3 is defined as b33, X1, X2, X3, and x3 satisfy the following relationship.

$$b31*X1+b32*X2+b33*X3=x3 \quad \text{[expression 7]}$$

For X1, X2, and X3, the simultaneous equations of [expression 4] to [expression 6] can be solved to acquire a pixel signal of an original image, that is, the pixel signals X1, X2, and X3 of the images passing through the three pupil regions.

Here, the simultaneous equations can be represented using [expression 9] in which a matrix B of [expression 8] is used.

$$B = \begin{bmatrix} b11 & b12 & b13 \\ b21 & b22 & b23 \\ b31 & b32 & b33 \end{bmatrix} \quad \text{[expression 8]}$$

$$\begin{bmatrix} b11 & b12 & b13 \\ b21 & b22 & b23 \\ b31 & b32 & b33 \end{bmatrix} * \begin{bmatrix} X1 \\ X2 \\ X3 \end{bmatrix} = \begin{bmatrix} x1 \\ x2 \\ x3 \end{bmatrix} \quad \text{[expression 9]}$$

X1, X2, and X3 are calculated by the following expression by multiplying both sides of [expression 9] by an inverse matrix $B^{-1}$ of the matrix B.

$$\begin{bmatrix} X1 \\ X2 \\ X3 \end{bmatrix} = \begin{bmatrix} b11 & b12 & b13 \\ b21 & b22 & b23 \\ b31 & b32 & b33 \end{bmatrix}^{-1} * \begin{bmatrix} x1 \\ x2 \\ x3 \end{bmatrix}$$

As described above, the pixel signals X1, X2, and X3 of the images obtained in each pupil region can be calculated from the pixel signals x1, x2, and x3 of each of the pixels P1 to P3, based on the ratio (interference amount) in which the light incident on each pupil region is received by each of the pixels P1 to P3. The matrix A in [expression 3] described above is the inverse matrix $B^{-1}$ of the matrix B ($A=B^{-1}$).

<Method of Dividing Pupils Using Light Blocking Mask>

A first light blocking mask having a first microlens and a first opening corresponding to the first pupil region is provided in the first pixel of the imaging element, and a second light blocking mask having a second microlens and a second opening corresponding to the second pupil region is provided in the second pixel of the imaging element. As a result, by using the light blocking masks (first light blocking mask and second light blocking mask) to divide the first pupil region and the second pupil region, luminous flux passing through each pupil region can be incident on the first pixel and the second pixel of the imaging element.

Figure 28:
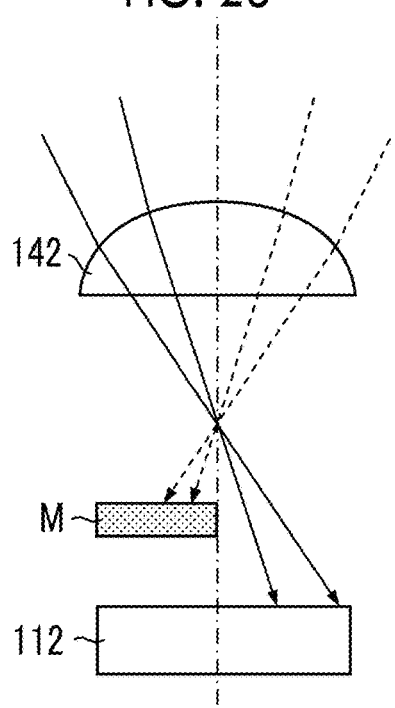
FIG. 28 is a diagram showing an example of one pixel of the imaging element having a light blocking mask.

FIG. 28 is a diagram showing an example of one pixel of the imaging element having the light blocking mask.

In FIG. 28, 112 is a photodiode and 142 is a microlens, and a light blocking mask M is disposed between the photodiode 112 and the microlens 142.

In addition, the light blocking mask M has an opening corresponding to a shape of each pupil region. The photodiode 112 receives only light passing through a desired pupil region by the light blocking mask M.

Therefore, by configuring the pixel block of the imaging element with a plurality of types of pixels provided with the light blocking mask M having an opening corresponding to the shape of each pupil region, images of each wavelength range passing through each pupil region can be acquired.

[Imaging Method]

FIG. 29 is a flowchart showing an embodiment of an imaging method according to the present invention. The imaging method shown in FIG. 29 corresponds to the imaging device 1 shown in FIG. 1, and in a case of performing the imaging method, the imaging optical system 10 according to the embodiment of the present invention is prepared.

In FIG. 29, the imaging device 1 determines whether or not there is a shooting instruction input for images in a plurality of wavelength ranges by, for example, an instruction input from a shutter release switch (step S10).

In a case where the imaging device 1 receives an instruction input for shooting, the imaging device 1 controls exposure to the imaging element 100 (step S12). As a result, in each of the pixels (first pixel P1 and second pixel P2) of the imaging element 100, charges corresponding to an amount of light incident on the photodiode are accumulated, and an electric signal corresponding to an amount of charge accumulated in each pixel is read out from the imaging element 100 as an image signal, and the image signal is output.

The signal processing unit 200 acquires the signal output from the imaging element 100 (step S14), and generates a first image in the first wavelength range based on the output signal of the first pixel P1 and generates a second image in the second wavelength range $\lambda 2$ based on the output signal of the second pixel P2.

As a result, the imaging device 1 can simultaneously capture the first image of the first wavelength range $\lambda 1$ and the second image of the second wavelength range $\lambda 2$ (multispectral image), and the first image and the second image are images having different wavelength ranges from each other by the bandpass filter unit 16. However, in the imaging device 10, since the axial chromatic aberration of the imaging optical system 10 due to the difference between the first wavelength range λ1 and the second wavelength range λ2 is reduced based on the relationship between the aberrations (in the embodiment of FIG. 1, spherical aberration) other than the axial chromatic aberration of the imaging optical system 10 and the positions of the first pupil region and the second pupil region of the imaging optical system 10, a multispectral image with improved axial chromatic aberration is captured.

[Others]

The imaging device according to the embodiment of the present invention is not limited to an imaging device for capturing a still image in a plurality of wavelength ranges, and may be an imaging device for simultaneously capturing a motion picture in a plurality of wavelength ranges.

In addition, the present invention is not limited to the imaging device, and includes an imaging optical system constituting the imaging device. For example, in a case of an imaging device in which the imaging optical system can be exchanged, by exchanging with an imaging optical system designed according to the wavelength range, it is possible to capture a multispectral image in a desired wavelength range.

The present invention is not limited to the above embodiments and can be subjected to various modifications without departing from the spirit of the present invention.

EXPLANATION OF REFERENCES

1: imaging device
10, 20, 30-1, 30-2, 40, 50: imaging optical system
11A, 11B: regulation point
12: lens
16, 16-2, 16-3, 16-4: bandpass filter unit
16A, 16-2A, 18A, 18-2A: frame
16B1, 16B2, 16-2B1, 16-2B2, 16-2B3, 16-2B4: bandpass filter
16A1, 16A2, 18A1, 18A2: opening region
18, 18-2: polarization filter unit
18B1, 18B2, 18-2B1, 18-2B2, 18-2B3: polarization filter
20A, 40A, 50A: front lens group
20B, 40B, 50B: rear lens group
32: stop
42, 52: stop plane
100, 100-2: imaging element
110: pixel array layer
112: photodiode
120: polarization filter element array layer
122A, 122B, 122C, 122D: polarization filter element
130: spectral filter element array layer
132A, 132B: spectral filter element
140: microlens array layer
142: microlens
200: signal processing unit
L: optical axis
M: light blocking mask
P1, P2, P3, P4: pixel
PB: pixel block
S10: step
S12: step
S14: step
Θ1, Θ2, Θ3, Θ4: polarization direction
Ωi: pupil region
α: angle of off-axis principal ray
β: angle of on-axis marginal ray

What is claimed is:

1. An imaging device comprising:
an imaging optical system which has a first pupil region for passing light in a first wavelength range and a second pupil region for passing light in a second wavelength range different from the first wavelength range, in which an axial chromatic aberration of the imaging optical system due to a difference between the first wavelength range and the second wavelength range is reduced based on a relationship between an aberration other than the axial chromatic aberration of the imaging optical system and positions of the first pupil region and the second pupil region in the imaging optical system;
an imaging element which includes a first pixel receiving the light passing through the first pupil region in the imaging optical system and a second pixel receiving the light passing through the second pupil region in the imaging optical system; and
a signal processing unit which processes a signal output from the imaging element, and generates each of a first image of the first wavelength range and a second image of the second wavelength range based on an output signal of the first pixel and an output signal of the second pixel,
wherein the imaging optical system has a front lens group disposed on an object side with respect to a stop, and a rear lens group disposed on an image side with respect to the stop,
the first pupil region and the second pupil region are located between the front lens group and the rear lens group, and
the front lens group has an angular magnification which makes an angle of off-axis principal ray incident on the first pupil region and the second pupil region close to perpendicular to a stop plane.

2. The imaging device according to claim 1,
wherein the aberration other than the axial chromatic aberration of the imaging optical system is a spherical aberration.

3. The imaging device according to claim 2,
wherein, in a case where the spherical aberration is negative, the first pupil region is a pupil region closer to an optical axis of the imaging optical system than the second pupil region, and
a representative wavelength of the first wavelength range is shorter than a representative wavelength of the second wavelength range.

4. The imaging device according to claim 3,
wherein the first pupil region is a circular or annular pupil region divided by a concentric circle centered on the optical axis of the imaging optical system, and the second pupil region is an annular pupil region outside the first pupil region.

5. An imaging device comprising:
an imaging optical system which has a first pupil region for passing light in a first wavelength range and a second pupil region for passing light in a second wavelength range different from the first wavelength range, in which an axial chromatic aberration of the imaging optical system due to a difference between the first wavelength range and the second wavelength range is reduced based on a relationship between an aberration other than the axial chromatic aberration of the imaging optical system and positions of the first pupil region and the second pupil region in the imaging optical system;
an imaging element which includes a first pixel receiving the light passing through the first pupil region in the imaging optical system and a second pixel receiving the light passing through the second pupil region in the imaging optical system; and a signal processing unit which processes a signal output from the imaging element, and generates each of a first image of the first wavelength range and a second image of the second wavelength range based on an output signal of the first pixel and an output signal of the second pixel, wherein the aberration other than the axial chromatic aberration of the imaging optical system is a coma aberration.

6. The imaging device according to claim 5, wherein an image-forming position of the light passing through the first pupil region on an optical axis of the imaging optical system is moved to an image side with respect to an image-forming position of the light passing through the second pupil region on the optical axis due to the coma aberration of the imaging optical system, and a representative wavelength of the first wavelength range is shorter than a representative wavelength of the second wavelength range.

7. The imaging device according to claim 6, wherein the imaging optical system has the coma aberration by which, among a first region and a second region which are located, with the optical axis in between, opposite to each other through a straight line intersecting the optical axis of the imaging optical system, an image-forming position of light incident on the first region on the optical axis is moved to the image side and an image-forming position of light incident on the second region on the optical axis is moved to an object side, and the first pupil region is a pupil region corresponding to the first region in the imaging optical system, and the second pupil region is a pupil region corresponding to the second region in the imaging optical system.

8. An imaging device comprising:

an imaging optical system which has a first pupil region for passing light in a first wavelength range and a second pupil region for passing light in a second wavelength range different from the first wavelength range, in which an axial chromatic aberration of the imaging optical system due to a difference between the first wavelength range and the second wavelength range is reduced based on a relationship between an aberration other than the axial chromatic aberration of the imaging optical system and positions of the first pupil region and the second pupil region in the imaging optical system;

an imaging element which includes a first pixel receiving the light passing through the first pupil region in the imaging optical system and a second pixel receiving the light passing through the second pupil region in the imaging optical system; and a signal processing unit which processes a signal output from the imaging element, and generates each of a first image of the first wavelength range and a second image of the second wavelength range based on an output signal of the first pixel and an output signal of the second pixel, wherein the aberration other than the axial chromatic aberration of the imaging optical system is an astigmatism.

9. The imaging device according to claim 8, wherein an image-forming position of the light passing through the first pupil region on an optical axis of the imaging optical system is moved to an image side with respect to an image-forming position of the light passing through the second pupil region on the optical axis due to the astigmatism of the imaging optical system, and a representative wavelength of the first wavelength range is shorter than a representative wavelength of the second wavelength range.

10. The imaging device according to claim 9, wherein the imaging optical system has the astigmatism by which an image-forming position of light incident on a first region symmetrical to the optical axis of the imaging optical system on the optical axis is moved to the image side, and an image-forming position of light incident on a second region which is symmetrical to the optical axis and orthogonal to the first region on the optical axis is moved to an object side, and the first pupil region is a pupil region corresponding to the first region in the imaging optical system, and the second pupil region is a pupil region corresponding to the second region in the imaging optical system.

11. The imaging device according to claim 1, wherein the imaging optical system includes a wavelength selective filter unit having a first wavelength selective filter which allows the light in the first wavelength range to pass through the first pupil region, and a second wavelength selective filter which allows the light in the second wavelength range to pass through the second pupil region.

12. The imaging device according to claim 1, wherein the imaging optical system further has a third pupil region for passing light in a third wavelength range intermediate between the first wavelength range and the second wavelength range, the third pupil region is a pupil region between the first pupil region and the second pupil region, the imaging element further includes a third pixel receiving the light passing through the third pupil region, and the signal processing unit further generates a third image of the third wavelength range based on an output signal of the third pixel.

13. The imaging device according to claim 1, wherein the imaging optical system includes a first polarization filter polarizing the light passing through the first pupil region in a first direction, and a second polarization filter polarizing the light passing through the second pupil region in a second direction different from the first direction, and a third polarization filter polarizing incident light in the first direction is provided in the first pixel of the imaging element, and a fourth polarization filter polarizing incident light in the second direction is provided in the second pixel of the imaging element.

14. The imaging device according to claim 1, wherein a third wavelength selective filter for passing the light in the first wavelength range of incident light is provided in the first pixel of the imaging element, and a fourth wavelength selective filter for passing the light in the second wavelength range of incident light is provided in the second pixel of the imaging element.

15. The imaging device according to claim 1, wherein a first light blocking mask having a first microlens and a first opening corresponding to the first pupil region is provided in the first pixel of the imaging element, and a second light blocking mask having a second microlens and a second opening corresponding to the second pupil region is provided in the second pixel of the imaging element.

16. The imaging device according to claim 1,
wherein the imaging optical system limits luminous flux incident on the imaging element only in a stop or only in the first pupil region and the second pupil region, which function as the stop.

17. The imaging device according to claim 1,
wherein the imaging optical system has a front lens group disposed on an object side with respect to a stop, and a rear lens group disposed on an image side with respect to the stop,
the first pupil region and the second pupil region are located between the front lens group and the rear lens group, and
the front lens group has a focal length which makes an angle of on-axis marginal ray incident on the first pupil region and the second pupil region close to perpendicular to a stop plane.

18. The imaging device according to claim 1,
wherein the first pupil region and the second pupil region function as a stop, or are adjacent to a stop.

19. The imaging device according to claim 1,
wherein, in a case where n represents an integer of 2 or more, i represents a parameter which changes in a range of 1 to n, $\Omega i$ represents an i-th pupil region in the imaging optical system, $\lambda_{ij}$ represents a representative wavelength of light transmitted the i-th pupil region $\Omega i$, $m_i$ represents the number of representative wavelengths in the i-th pupil region $\Omega i$, j represents a parameter which changes in a range of 1 to m, $\lambda_{ij}$ represents a j-th representative wavelength in the i-th pupil region $\Omega i$, $f(\lambda)$ represents a paraxial focal length of the imaging optical system at a wavelength $\lambda$, $g(x,y;\lambda)$ represents an on-axis longitudinal aberration of the wavelength $\lambda$ in a pupil coordinate (x,y) of the pupil region in the imaging optical system, and $S\Omega_i$ represents an area of the i-th pupil region $\Omega i$, the imaging optical system has a combination of i1, i2, j1, and j2 satisfying the following [expression 1] and [expression 2] (where, a≥b), $$|f(\lambda_{i_1 j_1}) - f(\lambda_{i_2 j_2})| > a \quad \text{[expression 1]}$$

$$\left| \left\{ \frac{\iint_{\Omega_{i_1}} g(x_{i_1}, y_{i_1}; \lambda_{i_1 j_1}) dx_{i_1} dy_{i_1}}{S_{\Omega_{i_1}}} - \frac{\iint_{\Omega_{i_2}} g(x_{i_2}, y_{i_2}; \lambda_{i_2 j_2}) dx_{i_2} dy_{i_2}}{S_{\Omega_{i_2}}} \right\} - \{f(\lambda_{i_1 j_i}) - f(\lambda_{i_2 j_2})\} \right| < b. \quad \text{[expression 2]}$$

20. The imaging device according to claim 19,
wherein, in a case where a pixel pitch of the imaging element is defined as p, b in the [expression 2] satisfies b≤8p.

21. An imaging optical system constituting the imaging device according to claim 1.

22. An imaging optical system comprising:
a first pupil region for passing light in a first wavelength range; and
a second pupil region for passing light in a second wavelength range different from the first wavelength range,
wherein an axial chromatic aberration of the imaging optical system due to a difference between the first wavelength range and the second wavelength range is reduced based on a relationship between an aberration other than the axial chromatic aberration of the imaging optical system and positions of the first pupil region and the second pupil region in the imaging optical system,
in a case where n represents an integer of 2 or more, i represents a parameter which changes in a range of 1 to n, $\Omega i$ represents an i-th pupil region in the imaging optical system, $\lambda_{ij}$ represents a representative wavelength of light transmitted the i-th pupil region $\Omega i$, $m_i$ represents the number of representative wavelengths in the i-th pupil region $\Omega i$, j represents a parameter which changes in a range of 1 to m, $\lambda_{ij}$ represents a j-th representative wavelength in the i-th pupil region $\Omega i$, $f(\lambda)$ represents a paraxial focal length of the imaging optical system at a wavelength $\lambda$, $g(x,y;\lambda)$ represents an on-axis longitudinal aberration of the wavelength $\lambda$ in a pupil coordinate (x,y) of the pupil region in the imaging optical system, and $S\Omega_i$ represents an area of the i-th pupil region $\Omega i$, the imaging optical system has a combination of i1, i2, j1, and j2 satisfying the following [expression 1] and [expression 2] (where, a≥b), $$|f(\lambda_{i_1 j_1}) - f(\lambda_{i_2 j_2})| > a \quad \text{[expression 1]}$$

$$\left| \left\{ \frac{\iint_{\Omega_{i_1}} g(x_{i_1}, y_{i_1}; \lambda_{i_1 j_1}) dx_{i_1} dy_{i_1}}{S_{\Omega_{i_1}}} - \frac{\iint_{\Omega_{i_2}} g(x_{i_2}, y_{i_2}; \lambda_{i_2 j_2}) dx_{i_2} dy_{i_2}}{S_{\Omega_{i_2}}} \right\} - \{f(\lambda_{i_1 j_i}) - f(\lambda_{i_2 j_2})\} \right| < b, \quad \text{[expression 2]}$$

the imaging optical system has a front lens group disposed on an object side with respect to a stop, and a rear lens group disposed on an image side with respect to the stop,
the first pupil region and the second pupil region are located between the front lens group and the rear lens group, and
the front lens group has an angular magnification which makes an angle of off-axis principal ray incident on the first pupil region and the second pupil region close to perpendicular to a stop plane.

23. An imaging method comprising:
a step of preparing an imaging optical system which has a first pupil region for passing light in a first wavelength range and a second pupil region for passing light in a second wavelength range different from the first wavelength range, in which an axial chromatic aberration of the imaging optical system due to a difference between the first wavelength range and the second wavelength range is reduced based on a relationship between an aberration other than the axial chromatic aberration of the imaging optical system and positions of the first pupil region and the second pupil region in the imaging optical system,
wherein the imaging optical system has a front lens group disposed on an object side with respect to a stop, and a rear lens group disposed on an image side with respect to the stop, the first pupil region and the second pupil region are located between the front lens group and the rear lens group, and the front lens group has an angular magnification which makes an angle of off-axis principal ray incident on the first pupil region and the second pupil region close to perpendicular to a stop plane;

a step of dividing each of the light passing through the first pupil region in the imaging optical system and the light passing through the second pupil region in the imaging optical system into pupils to be incident on a first pixel and a second pixel included in an imaging element; and a step of processing, by a signal processing unit, a signal output from the imaging element, and generating each of a first image of the first wavelength range and a second image of the second wavelength range based on an output signal of the first pixel and an output signal of the second pixel.

* * * * *